(12) United States Patent
Wang et al.

(10) Patent No.: US 9,097,904 B2
(45) Date of Patent: Aug. 4, 2015

(54) DISPLAY APPARATUS

(75) Inventors: Chy-Lin Wang, Taipei (TW); Golden Tiao, Hsinchu County (TW); Chir-Weei Chang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 367 days.

(21) Appl. No.: 13/545,002

(22) Filed: Jul. 10, 2012

(65) Prior Publication Data

US 2013/0010263 A1 Jan. 10, 2013

Related U.S. Application Data

(60) Provisional application No. 61/506,155, filed on Jul. 10, 2011.

(30) Foreign Application Priority Data

Jun. 28, 2012 (TW) .............................. 101123250 A

(51) Int. Cl.
*G03B 21/00* (2006.01)
*G02B 27/22* (2006.01)
*H04N 13/04* (2006.01)

(52) U.S. Cl.
CPC ........ *G02B 27/2292* (2013.01); *H04N 13/0406* (2013.01)

(58) Field of Classification Search
USPC ................. 353/7, 10; 359/619–628, 455, 463
See application file for complete search history.

(56) References Cited

U.S. PATENT DOCUMENTS

| 7,224,526 | B2 * | 5/2007 | Putilin et al. .................. 359/462 |
| 2006/0139759 | A1 * | 6/2006 | Hashimoto et al. ........... 359/619 |
| 2008/0291269 | A1 | 11/2008 | Hong et al. |
| 2009/0309842 | A1 | 12/2009 | Hung et al. |
| 2010/0110384 | A1 | 5/2010 | Maekawa |
| 2010/0182219 | A1 | 7/2010 | Tomisawa et al. |
| 2011/0181949 | A1 | 7/2011 | Hashikawa |

FOREIGN PATENT DOCUMENTS

| CN | 101641964 | 2/2010 |
| TW | 472170 | 1/2002 |
| TW | 200526980 | 8/2005 |

(Continued)

OTHER PUBLICATIONS

Moon et al., "Compensation of Image Distortion in Fresnel Lens-based 3D Projection Display System Using a Curved Screen," Proceedings of SPIE 6016 (601616), 2005, pp. 601616-1-601616-9.

(Continued)

*Primary Examiner* — Renee D Chavez
(74) *Attorney, Agent, or Firm* — Jianq Chyun IP Office

(57) ABSTRACT

A display apparatus including a plurality of image generating units is provided. Each of the image generating units includes an image source and a dioptric module. The image source provides an image beam. The dioptric module is disposed on a light path of the image beam and has dioptric power. The dioptric module forms an image floating in the air and corresponding to the image source, and the dioptric module is located between the image source and the image. The image generating units are arranged in an array, and the images formed by the image generating units are arranged in an array and combined to form an image frame.

28 Claims, 17 Drawing Sheets

(56) References Cited

FOREIGN PATENT DOCUMENTS

| | | |
|---|---|---|
| TW | 200638063 | 11/2006 |
| TW | M387270 | 8/2010 |

OTHER PUBLICATIONS

John A. Rupkalvis, "Human considerations in stereoscopic displays," Proceedings of SPIE 4297, Jan. 22, 2001, pp. 268-275.

Kakeya et al., "Multiview Autosterescopic Display with Floating Real Image," Proceedings of SPIE-IS&T Electronic Imaging 5291, Jan. 18, 2004, pp. 255-264.

Hideki Kakeya, "Real image based autostereoscopic display using a LCD, mirrors, and lenses," Proceedings of SPIE-IS&T Electronic Imaging 5006, Jan. 21, 2003, pp. 99-108.

Min et al., "Three-dimensional electro-floating display system using an integral imaging method," Optics Express 13 (12), Jun. 13, 2005, pp. 4358-4369.

Baasantseren et al., "Three-dimensional floating image system using a two-lens system and a stereoscopic display," Optical Engineering 46 (11), Nov. 2007, pp. 114002-1-114002-6.

"Office Action of Taiwan Counterpart Application", issued on Aug. 20, 2014, p. 1-p. 5.

* cited by examiner

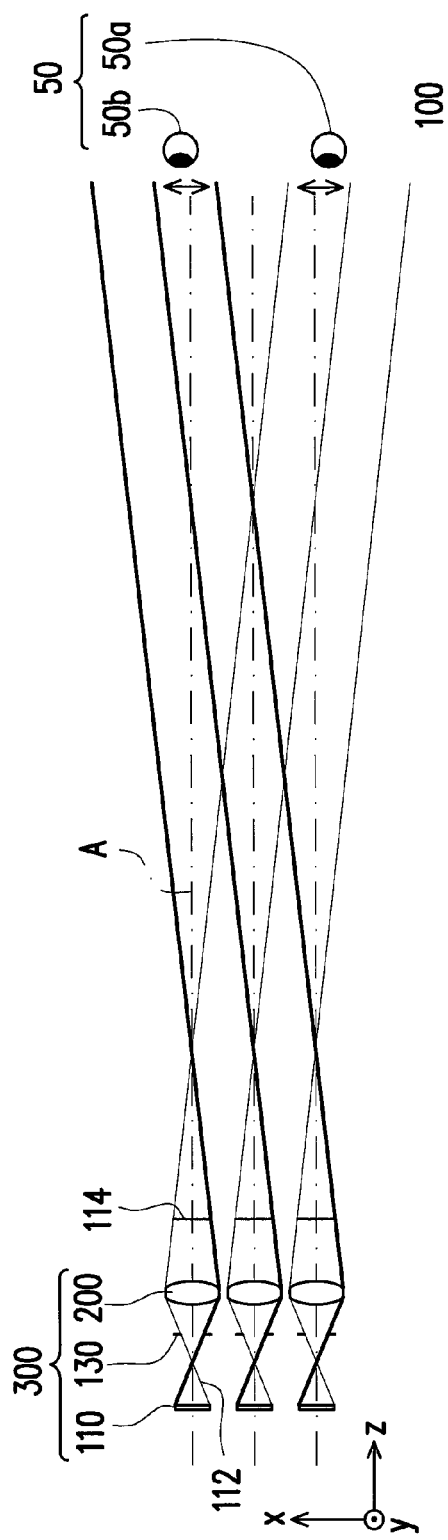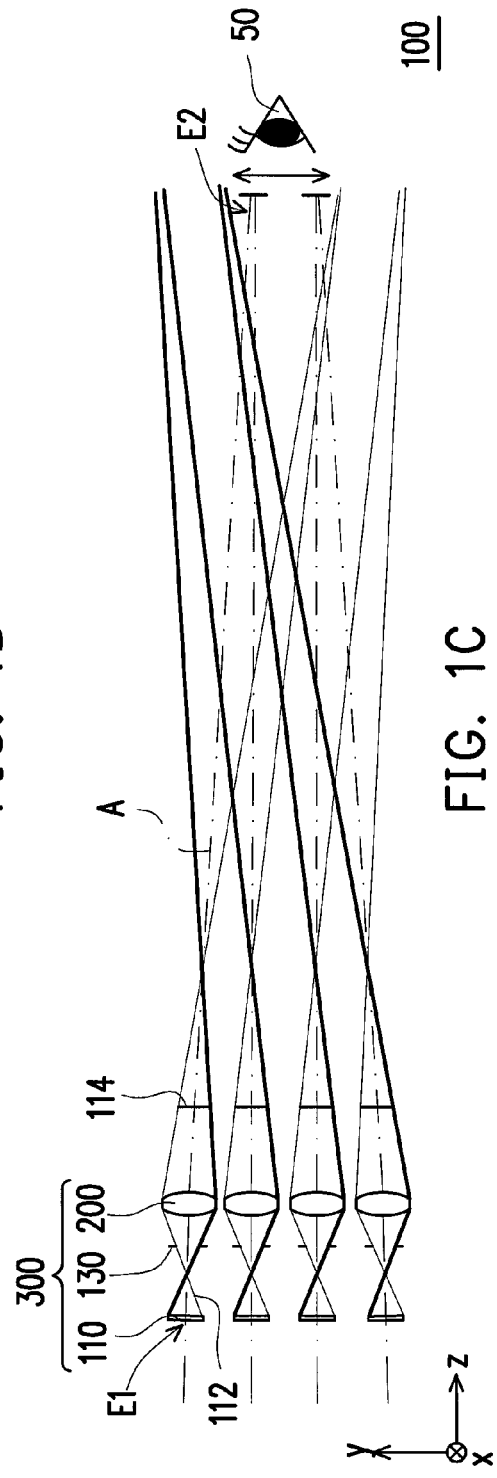
FIG. 1B
FIG. 1C

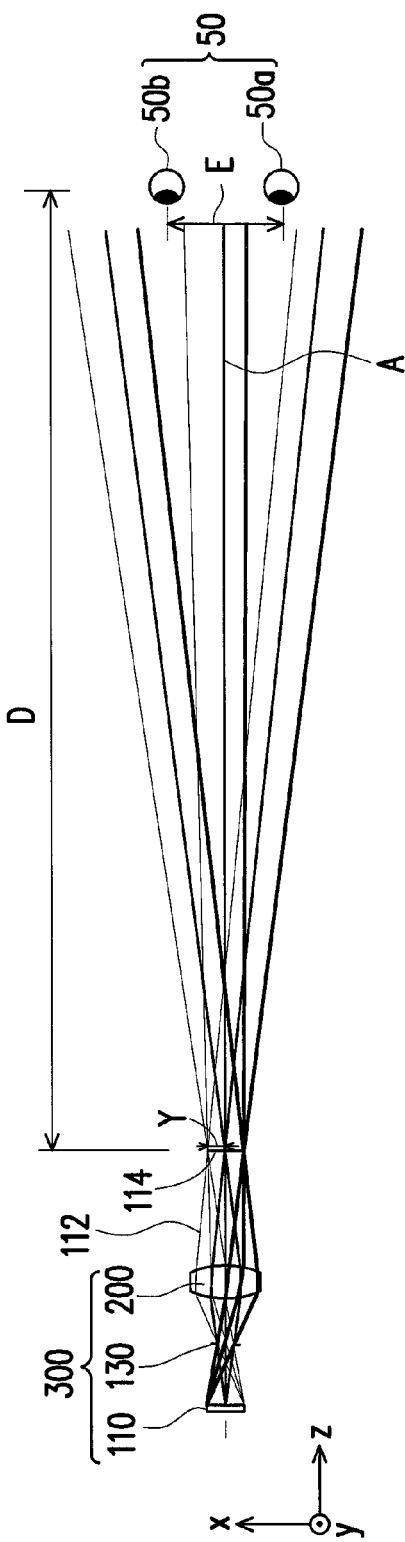
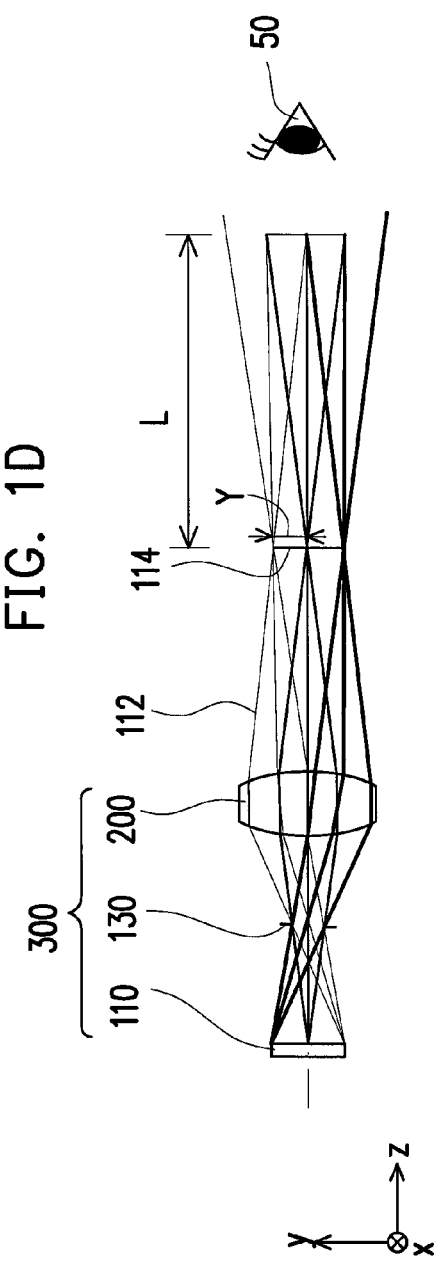
FIG. 1D
FIG. 1E

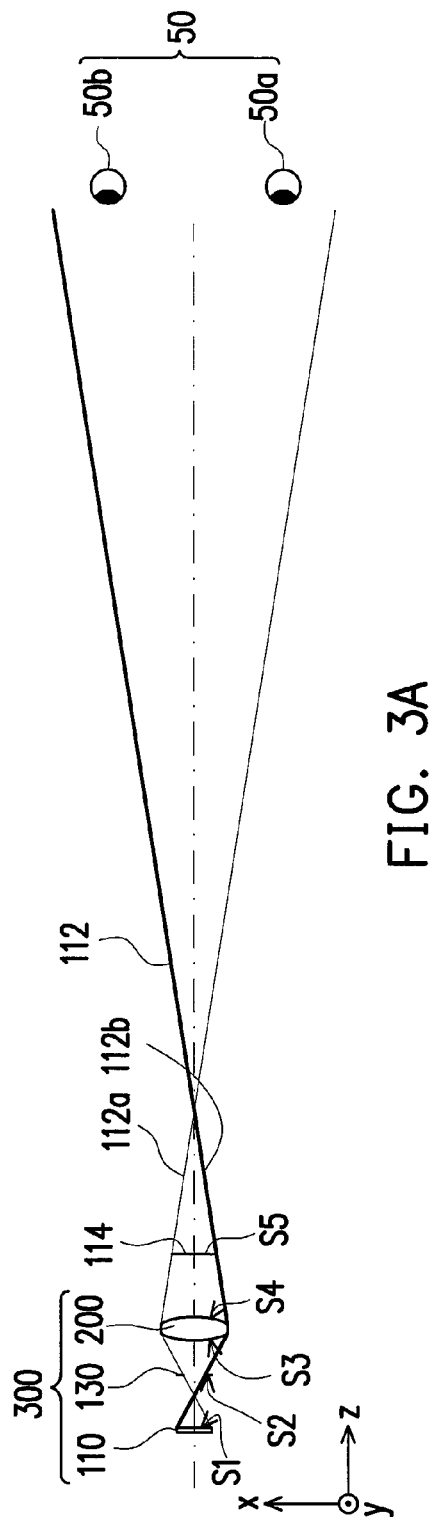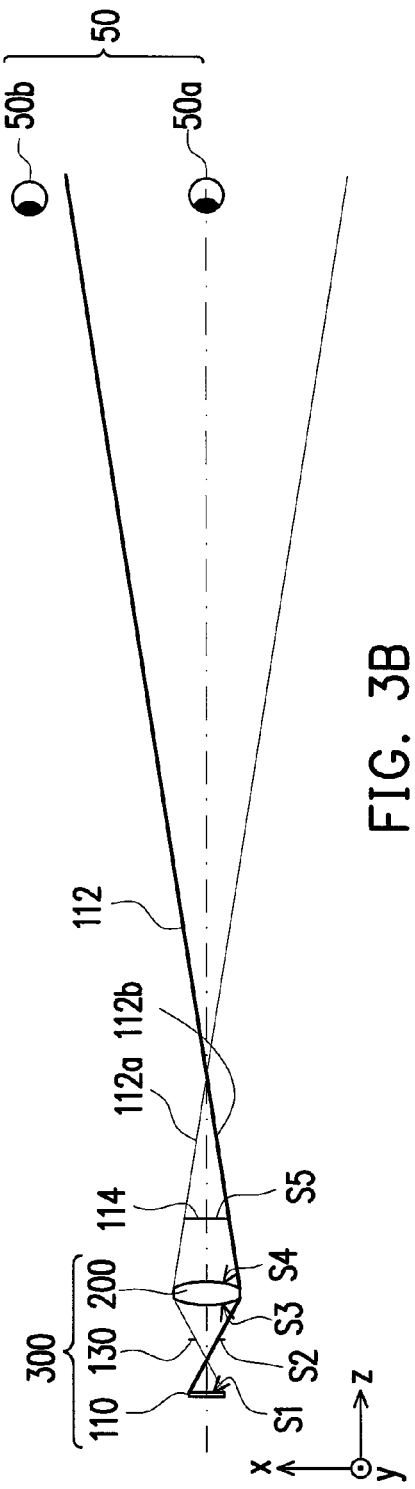

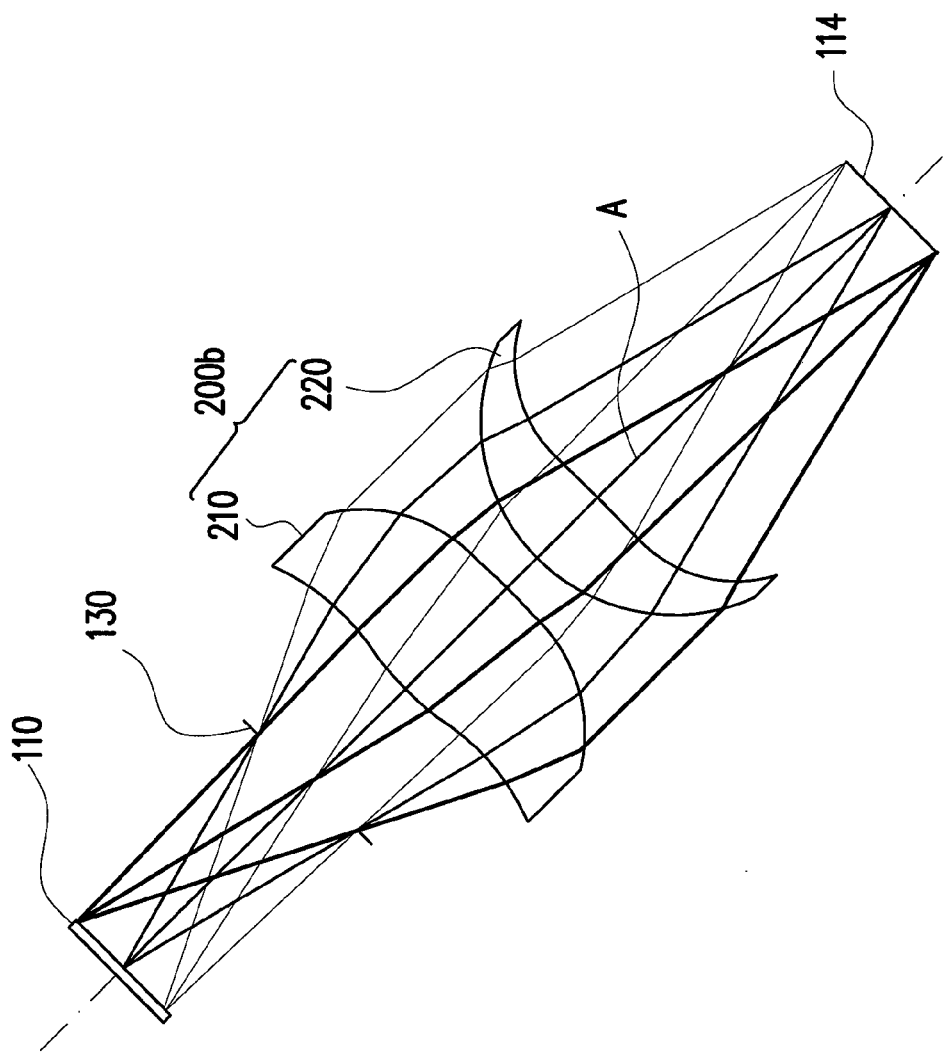

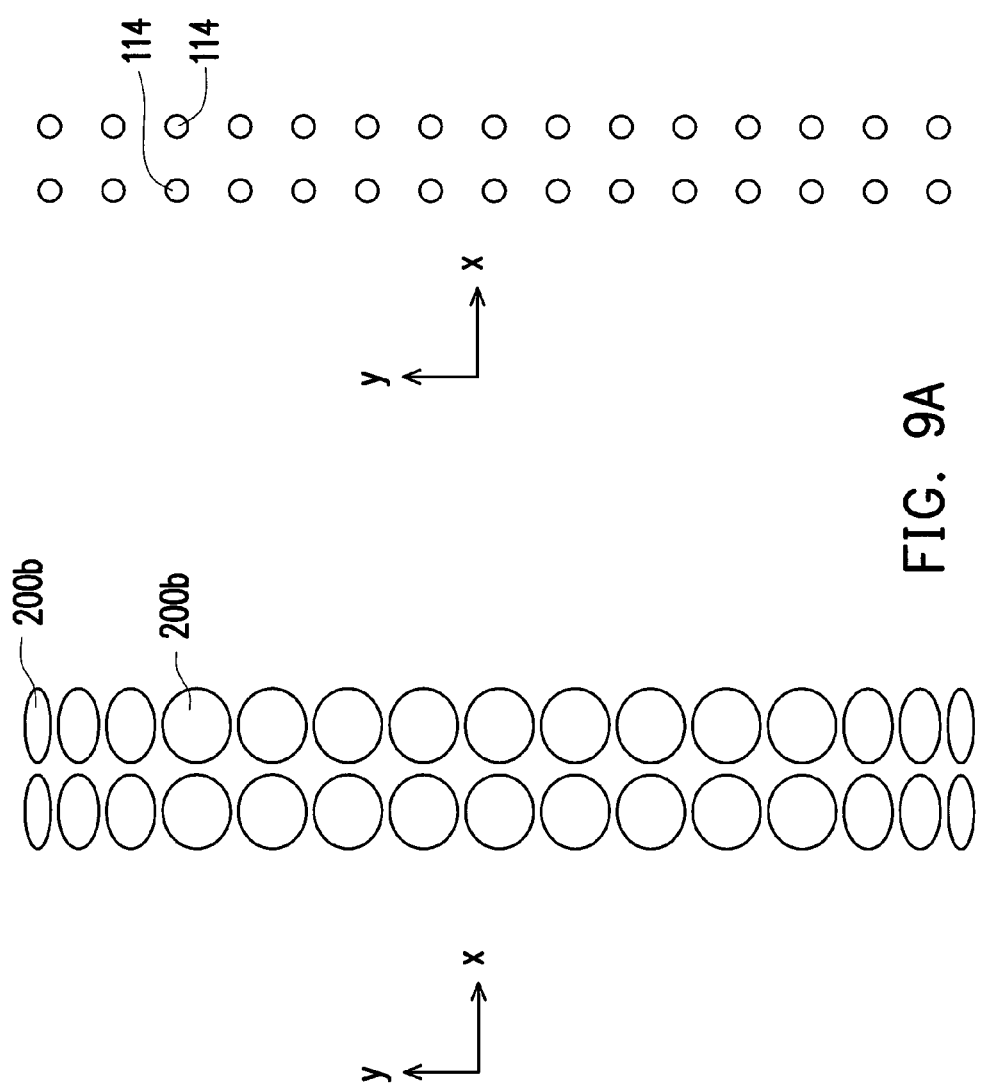

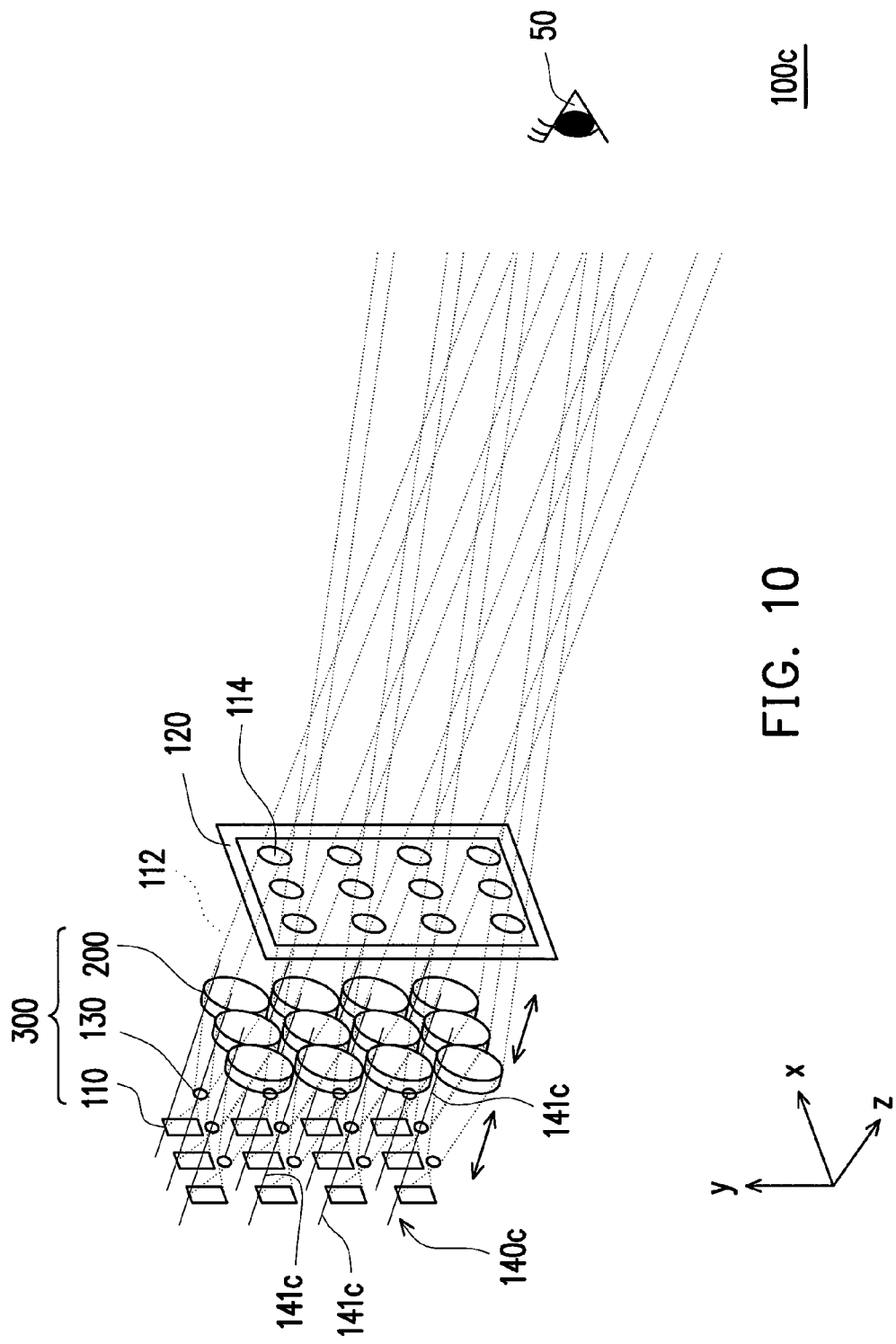

DISPLAY APPARATUS

CROSS-REFERENCE TO RELATED APPLICATION

This application claims the priority benefits of U.S. provisional application Ser. No. 61/506,155, filed on Jul. 10, 2011 and Taiwan application serial no. 101123250, filed on Jun. 28, 2012. The entirety of each of the above-mentioned patent applications is hereby incorporated by reference herein and made a part of this specification.

TECHNICAL FIELD

The disclosure relates to a display apparatus.

BACKGROUND

In recent years, continuous advancement of display technologies results in increasing demands on display quality of displays, such as image resolution, color saturation, and so on. In addition to the requirement for high image resolution and high color saturation, a touch control interface that allows a user to directly touch a display image and thereby interact with the display image has also been developed, such that the user's need of interacting with the display image may be satisfied.

At present, most touch control interfaces are operated by human's fingers touching touch panels to receive corresponding messages or feedbacks. However, due to frequent and constant touch actions, the touch interfaces may harbor germs or bacteria. Besides, under certain circumstances, e.g., given that the user's fingers have dirt or smudges, the user may not be comfortable with using the touch control interfaces and interacting with the display image for fear of smearing the touch panels.

To prevent the touch control interfaces from being stained or polluted, manufacturers have been looking forward to the development of an air-touch interface for a user to interact with floating images in virtual space. Accordingly, how to exclude display images from the limitation of varied distance between a user and the display apparatus is one of the significant issues to be resolved by the industry.

SUMMARY

In an embodiment of the disclosure, a display apparatus that comprises a plurality of image generating units is provided, and each of the image generating units comprises an image source and a dioptric module. The image source provides an image beam. The dioptric module is disposed on a light path of the image beam and has dioptric power. The dioptric module forms an image floating in the air and corresponding to the image source, and the dioptric module is located between the image source and the floating image. The image generating units are arranged in an array, and the images formed by the image generating units are arranged in an array and combined to form an image frame.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1B and FIG. 1C are side views illustrating the display apparatus depicted in FIG. 1A in two different directions, respectively.

FIG. 1D and FIG. 1E are side views illustrating an image generating unit depicted in FIG. 1B and FIG. 1C, respectively.

FIG. 3A illustrates that any of the eyes of the user observes the entire image 114, and FIG. 3B illustrates that neither of the eyes of the user observes the entire image 114.

FIG. 8A illustrates that the optical axis of the image generating unit is rotated but the image source is not rotated.

FIG. 9A is a front view illustrating the dioptric modules depicted in FIG. 7A.

FIG. 9B is a front view illustrating the image depicted in FIG. 7A.

FIG. 10 is a schematic three-dimensional view illustrating a display apparatus according to still another embodiment of the disclosure.

DETAILED DESCRIPTION OF DISCLOSED EMBODIMENTS

Figure 1A:
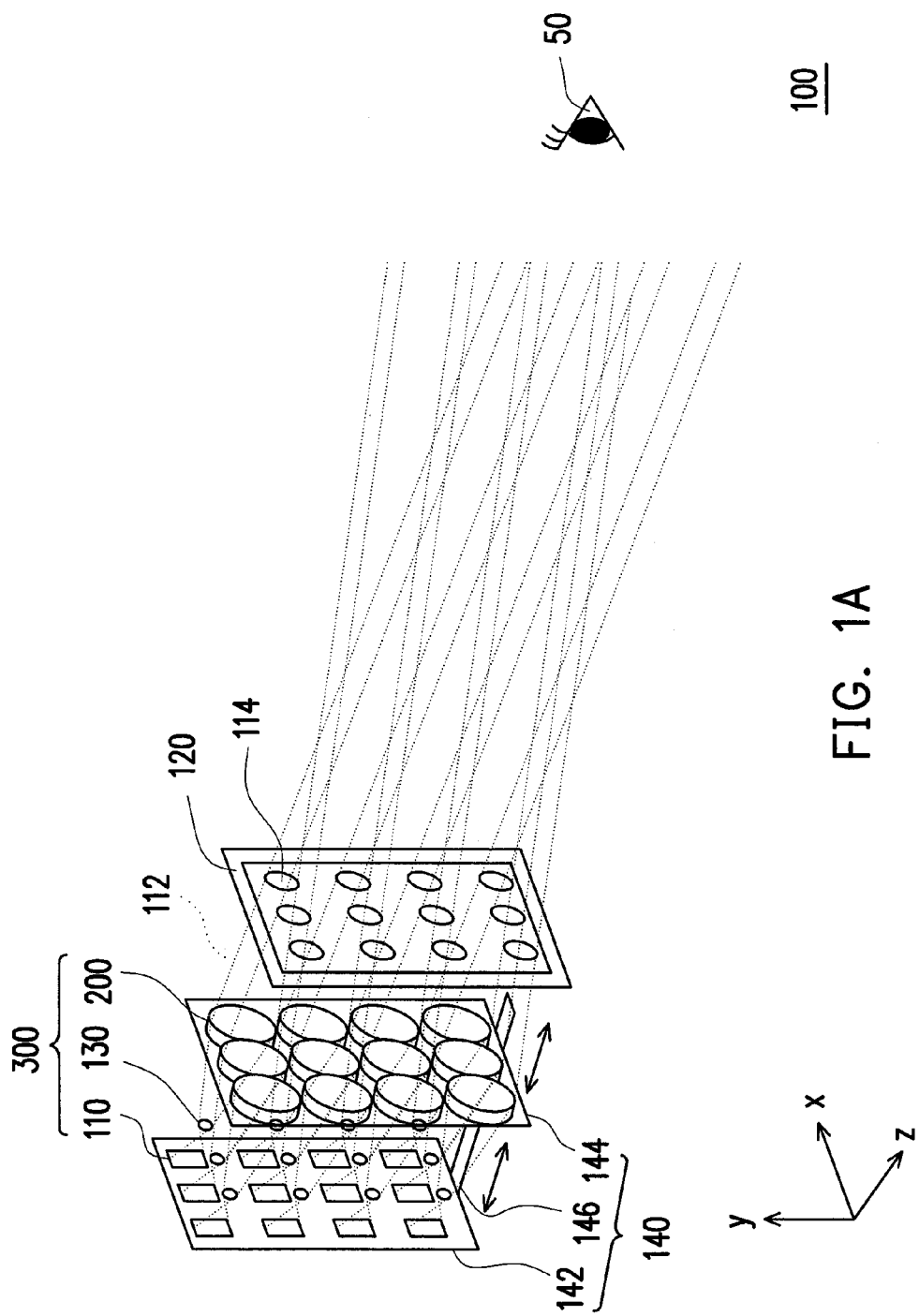
FIG. 1A is a schematic three-dimensional view illustrating a display apparatus according to an embodiment of the disclosure.

FIG. 1A is a schematic three-dimensional view illustrating a display apparatus according to an embodiment of the disclosure. FIG. 1B and FIG. 1C are side views illustrating the display apparatus depicted in FIG. 1A in two different directions, respectively. FIG. 1D and FIG. 1E are side views illustrating an image generating unit depicted in FIG. 1B and FIG. 1C, respectively. With reference to FIG. 1A to FIG. 1E, the display apparatus 100 described in the present embodiment comprises a plurality of image generating units 300, and each of the image generating units 300 comprises an image source 110 and a dioptric module 200. The image source 110 provides an image beam 112. In the present embodiment, the image source 110 is a display panel, e.g., a liquid crystal display (LCD) panel, an organic light-emitting diode (LED) display panel, a plasma display panel, or any other appropriate display panel. In another embodiment, the image source 110 may also be a light-emitting device, e.g., an LED or any other appropriate light-emitting device. In yet another embodiment, the image source 110 may be an object irradiated by light, e.g., slides, normal pictures, or any other appropriate object.

The dioptric module 200 is disposed on a light path of the image beam 112 and has dioptric power. The dioptric module 200 may comprise at least one lens. In FIG. 1A, each of the dioptric modules 200 exemplarily comprises one lens. The dioptric module 200 forms an image 114 floating in the air and corresponding to the image source 110, and the dioptric module 200 is located between the image source 110 and the floating image 114. In the present embodiment, the image 114 is a real image of the image source 110 formed by the dioptric module 200. In other embodiments, the dioptric module 200 may comprise at least one mirror having dioptric power, for example, a concave mirror or a convex mirror. Alternatively, the dioptric module 200 may comprise both at least one mirror having dioptric power and at least one lens having dioptric power.

The image generating units 300 are arranged in an array, and the images 114 formed by the image generating units 300 are arranged in an array and combined to form an image frame. According to the present embodiment, the image generating units 300 are arranged in a two-dimensional array, and so are the images 114, which should however not be construed as limitations to the disclosure. According to another embodiment, the image generating units 300 may also be arranged in a one-dimensional or three-dimensional array, and so are the images 114.

In the display apparatus 100 described in the present embodiment, the dioptric modules 200 respectively form the images 114 of the image sources 110 floating in the air, and the floating images 114 may be combined in the air to form an image frame. Thereby, the floating image frame may be generated by the display apparatus 100. As such, when the display apparatus 100 is applied together with an optical detection apparatus, the optical detection apparatus may detect the location of a user's finger and determine whether the user's finger touches the floating image frame, so as to form a non-contact floating air-touch interface. Namely, the user is allowed to interact with the display apparatus 100 without touching the display apparatus 100. Thereby, in case of germs or smudges on the user's finger, the user is still be able to interact with the display apparatus 100 without smearing the display apparatus 100. For instance, the display apparatus 100 in this embodiment may be applied to a medical human-machine interface (e.g., an interface for controlling medical instruments in an operating room, an interface of a registration system in a hospital, and so on) to present infection of germs. In addition, since plural dioptric modules 200 are employed, the dimension of each dioptric module 200 may be reduced, and thus the lenses in the dioptric modules 200 may have the reduced size. Thereby, the image frame may be formed in no need of manufacturing a lens with large size, and the display apparatus 100 in this embodiment may overcome the difficulty in manufacturing the large-size lens as well as reduce the manufacturing costs.

In the present embodiment, the space where the image generating unit 300 is located may be defined by a Cartesian coordinate system containing x, y, and z axes that are perpendicular to one another. Here, an optical axis A of the image generating unit 300 is substantially parallel to the z axis, the x axis is substantially parallel to an arrangement direction of a left eye 50a and a right eye 50b of a user, and the y axis is substantially perpendicular to the x axis and the z axis.

Each of the image generating units 300 in this embodiment satisfies NA≥sin(tan$^{-1}$(Y/L)), where NA is a numerical aperture of the image generating unit 300, Y is half the height of the image 114 formed by the image generating unit 300 (e.g., half the height in the y-axis direction), L is a distance from the image 114 to one eye of the user (e.g., any of the left eye 50a and the right eye 50b of the user) along a direction parallel to the optical axis A of the dioptric module 200 (e.g., the distance in the z-axis direction), and the distance L is the shortest distance allowing the one eye of the user to observe the entire image 114. The image 114 is located between the dioptric module 20 and the eye 50 of the user. If the distance from the image 114 to the eye 50 of the user is less than the distance L, the user is not able to observe the entire image 114 with the complete height (i.e., 2Y); if the distance from the image 114 to the eye 50 of the user is greater than or equal to the distance L, the user is allowed to observe the entire image with the complete height (i.e., 2Y). In the image generating unit of the present embodiment, 25 centimeter (cm)≤L≤2 meter (m); that is, the image 114 is at a location where the user's finger or an object held by the user can touch. Thereby, the user may interact with the display apparatus 100 through touching the image 114.

Additionally, each of the image generating units 300 in this embodiment satisfies NA≥sin(tan$^{-1}$((2Y+E)/2D)), where NA is a numerical aperture of the image generating unit 300, Y is half the height of the image 114 formed by the image generating unit 300 (e.g., half the height in the x-axis direction), E is an interval between two eyes of a user (i.e., the left eye 50a and the right eye 50b), D is a distance from the image 114 to the two eyes of the user (i.e., the left eye 50a and the right eye 50b) along a direction parallel to the optical axis A of the dioptric module 200, and the distance D is the shortest distance allowing each of the two eyes of the user to observe the entire image. If the distance from the image 114 to the eyes 50 of the user is greater than or equal to the distance D, any of the eyes 50 (the left eye 50a and the right eye 50b) of the user is allowed to observe the entire image with the complete height (i.e., 2Y). However, if the distance from the image 114 to the eyes 50 of the user is less than the distance D, any of the eyes 50 (the left eye 50a and the right eye 50b) of the user is not allowed to observe the entire image with the complete height (i.e., 2Y). For instance, the left eye 50a may see the left-half image but not the right-half image, and the right eye 50b may see the right-half image but not the left-half image. According to the present embodiment, 25 cm≤D≤2 m; that is, the image 114 is at a location where the user's finger or an object held by the user can touch.

In this embodiment, a distance from the image frame formed by the image generating units 300 to the eyes 50 of the user is less than or substantially equal to a length of an out-stretched arm of the user. Thereby, the user may interact with the image generating units 300 through his or her hand.

Figure 2B:
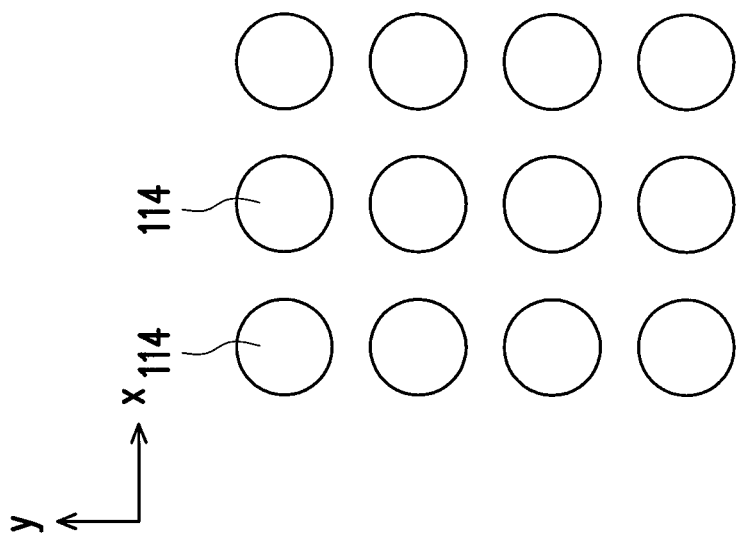
FIG. 2B is a front view illustrating the image depicted in FIG. 1A.
Figure 2A:
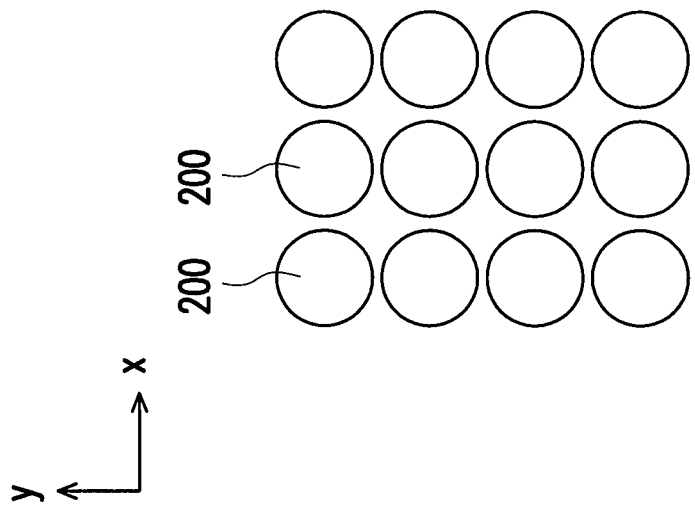
FIG. 2A is a front view illustrating the dioptric module depicted in FIG. 1A.

In the present embodiment, each of the image generating units 300 further comprises an aperture stop 130 disposed on a light path of the image beam 112 and located between the image source 110 and the dioptric module 200. An opening angle of the image beam 112 is subject to the aperture stop 130, and hence the image beam 112 generated by the image source 110 of one image generating unit 300 is not transmitted to the adjacent image generating unit 300. As such, the images 114 formed by the image generating units 300 are not overlapped, and the clarity and the accuracy of the image frame may be improved. FIG. 2A is a front view illustrating the dioptric module depicted in FIG. 1A. FIG. 2B is a front view illustrating the image depicted in FIG. 1A. As shown in FIG. 2A, there is space between the dioptric modules 200 of two adjacent image generating units 300, for instance. In the present embodiment, space exists among the images 114 respectively formed by the image generating units 300. Thus, it may be further assured that the two adjacent images 114 are not overlapped, as shown in FIG. 2B. With reference to FIG. 2A, in the present embodiment, the lens in the dioptric module 200 may be a circular lens (i.e., axially-symmetrical lens relative to the optical axis A). Nonetheless, the lens of each of the image generating units 300 may be a circular lens, a circular lens with one side cut off, a circular lens with two adjacent sides cut off, or a combination thereof.

In other embodiments of the disclosure, the aperture stop 130 may be located between the dioptric module 200 and the image 114 or between two adjacent lenses of the dioptric module 200 arranged along the optical axis A. Alternatively, in another embodiment of the disclosure, an edge of one lens of the dioptric module 200 may be an edge of the aperture stop 130.

In the present embodiment, as shown in FIG. 1A, the display apparatus 100 may further comprise a side frame 120 that surrounds the images 114. The images 114 and the side frame 120 may be approximately located on the same plane. Upon the guidance of the side frame 120, the eyes 50 of the user are easily focused on regions where the images 114 are located. However, in another embodiment of the disclosure, the display apparatus 100 may not be equipped with the side frame, and the user may directly look at the images 114 with his or her eyes 50.

FIG. 3A illustrates that any of the eyes of the user observes the entire image 114, and FIG. 3B illustrates that neither of the eyes of the user observes the entire image 114. With reference to FIG. 3A and FIG. 3B, according to the illustration, a marginal ray 112a of the image beam 112 comes from the left end of the image source 110 (i.e., the x coordinate has the minimum value) and passes through the right end of the image 114 (i.e., the x coordinate has the maximum value), and a marginal ray 112b of the image beam 112 comes from the right end of the image source 110 (i.e., the x coordinate has the maximum value) and passes through the left end of the image 114 (i.e., the x coordinate has the minimum value). When both the left eye 50a and the right eye 50b of the user are located between the marginal ray 112a and the marginal ray 112b, as shown in FIG. 3A, both the left eye 50a and the right eye 50b may observe the image 114 with the complete height in the x-axis direction. When one of the left and right eyes 50a and 50b (e.g., the left eye 50a shown in FIG. 3B) is located between the marginal ray 112a and the marginal ray 112b and the other (e.g., the right eye 50b shown in FIG. 3B) is not, the eye (e.g., the left eye 50a) between the marginal ray 112a and 112b may observe the image 114 with the complete height in the x-axis direction, but the other eye (e.g., the right eye 50b) not between the marginal ray 112a and 112b may not observe the image 114 with the complete height in the x-axis direction.

Figure 4:
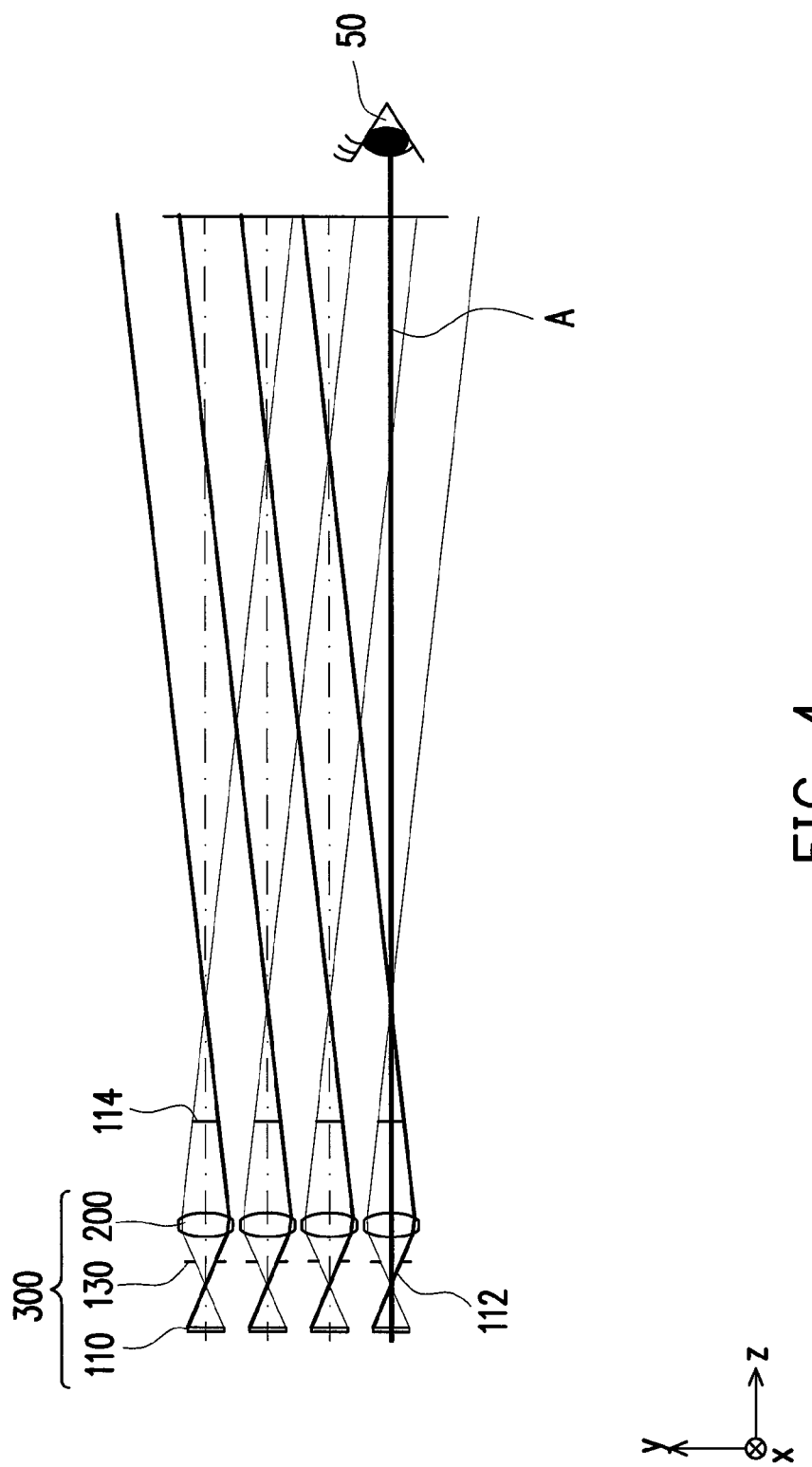
FIG. 4 illustrates a modification of the display apparatus shown in FIG. 1C.

Likewise, in another direction (e.g., the y-axis direction), if the eyes 50 of the user are located between the marginal ray that comes from the upper end of the image source 110 (i.e., the y coordinate has the maximum value) and passes through the lower end of the image 114 (i.e., the y coordinate has the minimum value) and the marginal ray that comes from the lower end of the image source 110 (i.e., the y coordinate has the minimum value) and passes through the upper end of the image 114 (i.e., the y coordinate has the maximum value), the eyes 50 are able to observe the image 114 with the complete height in the y-axis direction. Nonetheless, if the eyes 50 are not located between said two marginal rays, the eyes 50 are unable to observe the image 114 with the complete height in the y-axis direction. FIG. 4 illustrates a modification of the display apparatus shown in FIG. 1C. With reference to FIG. 4, the eye 50 of the user is on the optical axis A of the fourth image generating unit 300 (counting from the top to the bottom), and the optical axes A of the four image generating units 300 shown in FIG. 4 are parallel to one another, for instance. At this time, the eye 50 is located between the two opposite marginal rays of the fourth image generating unit 300 and between the two opposite marginal rays of the third image generating unit 300 but is neither located between the two opposite marginal rays of the second image generating unit 300 nor between the two opposite marginal rays of the first image generating unit 300. Hence, the eye 50 is able to observe the third and fourth images 114 (counting from the top to the bottom) with the complete heights but is unable to observe the first and second images 114 (counting from the top to the bottom) with the complete heights. As a result, in the embodiment shown in FIG. 4, when the user is at a location that allows him or her to touch the images 114 with his or her hand, both eyes of the user may observe parts of the images 114; after the eyes of the user are moved to a different location, the user may see different parts of the images 114.

With reference to FIG. 1C, if it is intended for the eye 50 not to move but to observe the entire images 114 with the complete heights in the y-axis direction, the optical axes A of the image generating units 300 may be arranged more densely at a location close to the eye 50 and arranged more sparsely at a location close to the image sources 110. Specifically, the optical axis A of each of the image generating units 300 has a first end E1 located at the image source 110 and a second end E2 close to the eye 50 of the user, and the second ends E2 of the optical axes A of the image generating units 300 are arranged more densely than the first ends E1 of the optical axes A. Thereby, the eye 50 may be located between two opposite marginal rays of each of the image generating units 300 and is thus able to observe the images 114 with the complete heights in the y-axis direction.

Besides, as shown in FIG. 1B, the left eye 50a of the user is located between two opposite marginal rays respectively in the second and third image generating units 300 (counting from the right to the left, i.e., counting along a −x-axis direction) but is not located between two opposite marginal rays in the first image generating unit 300, the left eye 50a of the user is able to observe the second and third images 114 with the complete heights in the x-axis direction but is unable to observe the first image 114 with the complete height in the x-axis direction. Similarly, the right eye 50b of the user is located between two opposite marginal rays respectively in the first and second image generating units 300 (counting from the right to the left, i.e., counting along the −x-axis direction) but is not located between two opposite marginal ray in the third image generating unit 300, the right eye 50b of the user is able to observe the first and second images 114 with the complete heights in the x-axis direction but is unable to observe the third image 114 with the complete height in the x-axis direction. Namely, under said circumstances, the left eye 50a of the user observes parts of the images 114, and the right eye 50b of the user observes the other parts of the images 114.

In an embodiment of the disclosure, the optical axes A shown in FIG. 1B may be rotated in a direction parallel to the x-z plane, such that both eyes of the user are located between two opposite marginal rays respectively in each of the image generating units 300. That is, the optical axes A are arranged more densely at a location close to the eyes 50. At this time, all of the images 114 may be observed by both eyes of the user simultaneously. In the present embodiment, the optical parameters of the image generating units 300 are substantially the same, e.g., the numerical apertures of the image generating units 300 are substantially identical, and dimensions of the images 114 formed by the image generating units 300 are substantially identical. Nevertheless, in other embodiments of the disclosure, at least part of the optical parameters of the image generating units 300 may be different. For instance, the numerical apertures of the image generating units 300 are different, but the dimensions of the images 114 formed by the image generating units 300 are substantially identical. Alternatively, the numerical apertures of the image generating units 300 are different, and the dimensions of the images 114 formed by the image generating units 300 are different.

Additionally, the image generating units 300 with different optical parameters may respectively form the images 114 at different distances, such that the image frame composed of the images 114 may bring about the sense of depth, i.e., the image frame may become a three-dimensional (3D) image frame. Thereby, the display apparatus 100 may become a stereoscopic display apparatus. The stereoscopic display apparatus in this embodiment does not require the specially designed eyeglasses, and the conventional crosstalk issue of the auto-stereoscopic display technology does not occur in said stereoscopic display apparatus. In another embodiment of the disclosure, the image source 110 may be a stereoscopic display panel, and the display apparatus 100 may become the stereoscopic display apparatus regardless of whether the optical parameters of the image generating units 300 are identical or different.

It can be learned from the previous embodiments that the eyes 50 of the user may observe the images 114 if the eyes 50 are located in front of the display apparatus 100; however, the images 114 may not be observed by the eyes 50 if the user looks at the display apparatus 100 in an overly tilt direction. As such, the display apparatus 100 can perform an anti-spying function. For instance, the display apparatus 100 may be applied to a private ATM or an access control security system, and the image frame provided by the display apparatus 100 at this time may be composed of floating images of keys. Only the user in front of the display apparatus 100 may see the images of keys and perform touch actions on the images, while other people next to the user are unable to see the images of keys. Specifically, other people may merely see the spatial movement of fingers of the user and cannot see the specific keys touched by the user. Thereby, the user privacy can be protected.

As shown in FIG. 1A, the display apparatus 100 described in the present embodiment further comprises an object distance adjusting unit 140 that connects the image sources 110 and the dioptric modules 200, so as to adjust a distance between the image sources 110 and the dioptric modules 200. For instance, the object distance adjusting unit 140 may comprise a fixing frame 142, another fixing frame 144, and a track 146. The fixing frame 142 fixes the image sources 110, the fixing frame 144 fixes the dioptric modules 200, and at least one of the fixing frames 142 and 144 may move along the track 146, so as to change the distance (i.e., the object distance) between the image sources 110 and the dioptric modules 200. According to the present embodiment, when the fixing frame 142 moves along the track 146, the image sources 110 are also moved at the same time. Similarly, when the fixing frame 144 moves along the track 146, the dioptric modules 200 are also moved at the same time. As the object distance decreases, the distance (i.e., the image distance) between the dioptric modules 200 and the images 114 increases, such that the dimensions of the images 114 increase, and that an interval between two adjacent images 114 decreases. As the object distance increases, the distance (i.e., the image distance) between the dioptric modules 200 and the images 114 decreases, such that the dimensions of the images 114 decrease, and that an interval between two adjacent images 114 increases. When the object distance decreases, the interval among the images 114 may be sequentially longer than, equal to, and shorter than the interval among the dioptric modules 200. The object distance adjusting unit 140 described in the disclosure is not limited to be equipped with the fixing frames 142 and 144 and the track 146. Any other mechanism or mechanical apparatus subject to forces may be the object distance adjusting unit 140 in this embodiment as long as the mechanism or apparatus can adjust the object distance. Here, the forces refer to electrostatic forces, magnetic forces, electromagnetic forces, contact forces, forces at a distance, or any other force in mechanics or dynamics.

An embodiment of the image generating unit 300 is provided below. However, the disclosure is not limited to the data listed in the following Table 1 and Table 2, and those having the ordinary skill in the art may properly make modifications and variations to the parameters or the configurations in this embodiment after referring to the disclosure without departing from the scope or spirit of the disclosure.

TABLE 1

| Surface | Radius (mm) | Interval (mm) | Material | Notes |
| --- | --- | --- | --- | --- |
| S1 | infinity | 28.018 | | Image source |
| S2 | infinity | 21.502 | | Aperture stop |
| S3 | 27.670 | 13.000 | PMMAO | First lens |
| S4 | −22.337 | 50.000 | | |
| S5 | infinity | | | Image |

In Table 1, the interval refers to a linear distance on the optical axis A between two adjacent surfaces. For instance, the interval of the surface S1 is the linear distance on the optical axis A between the surfaces S1 and S2. The corresponding thickness of the lens provided in the "Notes" column refers to the numerical value of the "Interval" at the same row, and the corresponding material of the lens provided in the "Notes" column refers to the code of material at the same row. For instance, "PMMAO" refers to the code of the material of the lens.

Besides, in Table 1, the surface S1 is the active surface of the image source 110. The surface S2 is the aperture stop 130. The surfaces S3 and S4 are two opposite surfaces of the lens in the dioptric module 200. The surface S5 is the image 114. The radius of curvature, the interval, and other parameters of each surface are shown in Table 1 and will not be further described hereinafter. It can be learned from Table 1 that the lens of the dioptric module 200 described in the present embodiment has positive dioptric power, and the lens herein is a biconvex lens, for instance.

The surfaces S3 and S4 are aspheric surfaces and may be represented by the following equation:

$$Z = \frac{cr^2}{1 + \sqrt{1 - (1+k)c^2 r^2}} + A_1 r^2 + A_2 r^4 + A_3 r^6 + A_4 r^8 + A_5 r^{10} + \ldots$$

In the equation, Z is a sag in the direction of the optical axis A, and c is the reciprocal of the radius of an osculating sphere (e.g., the radius of the surfaces S3 and S4 in Table 1). k is the conic coefficient, and r is the height of the aspheric surface, where the height is defined as a height from a center to an edge of the lens. $A_1, A_2, A_3, A_4, A_5, \ldots$ are aspheric coefficients, and the coefficient $A_1$ is zero. The parameter values of the surfaces S3 and S4 are listed in Table 2.

TABLE 2

| Aspheric parameter | Conic coefficient k | Coefficient $A_2$ | Coefficient $A_3$ | Coefficient $A_4$ | Coefficient $A_5$ |
|---|---|---|---|---|---|
| S3 | 0.000 | 3.628E−06 | 1.310E−08 | 0.000 | 0.000 |
| S4 | 0.202 | 3.559E−05 | 7.363E−08 | 0.000 | 0.000 |

In Table 2, 3.628E-06 refers to $3.628 \times 10^{-6}$, and other numerical values can also be deduced from this principle.

In the present embodiment, a magnification of the image generating unit 300 is 1, the object height is 7.5 mm, the image height (i.e., the height of images 114) is 7.5 mm, the focal length of the dioptric module 200 is 27.39 mm, a numerical aperture of the dioptric module 200 is 0.2, and the difference between the location of the aperture stop 130 and the location of the front focus of the dioptric module 200 is 0.62 mm, for instance, which should not be construed as limitations to the disclosure.

Figure 5A:
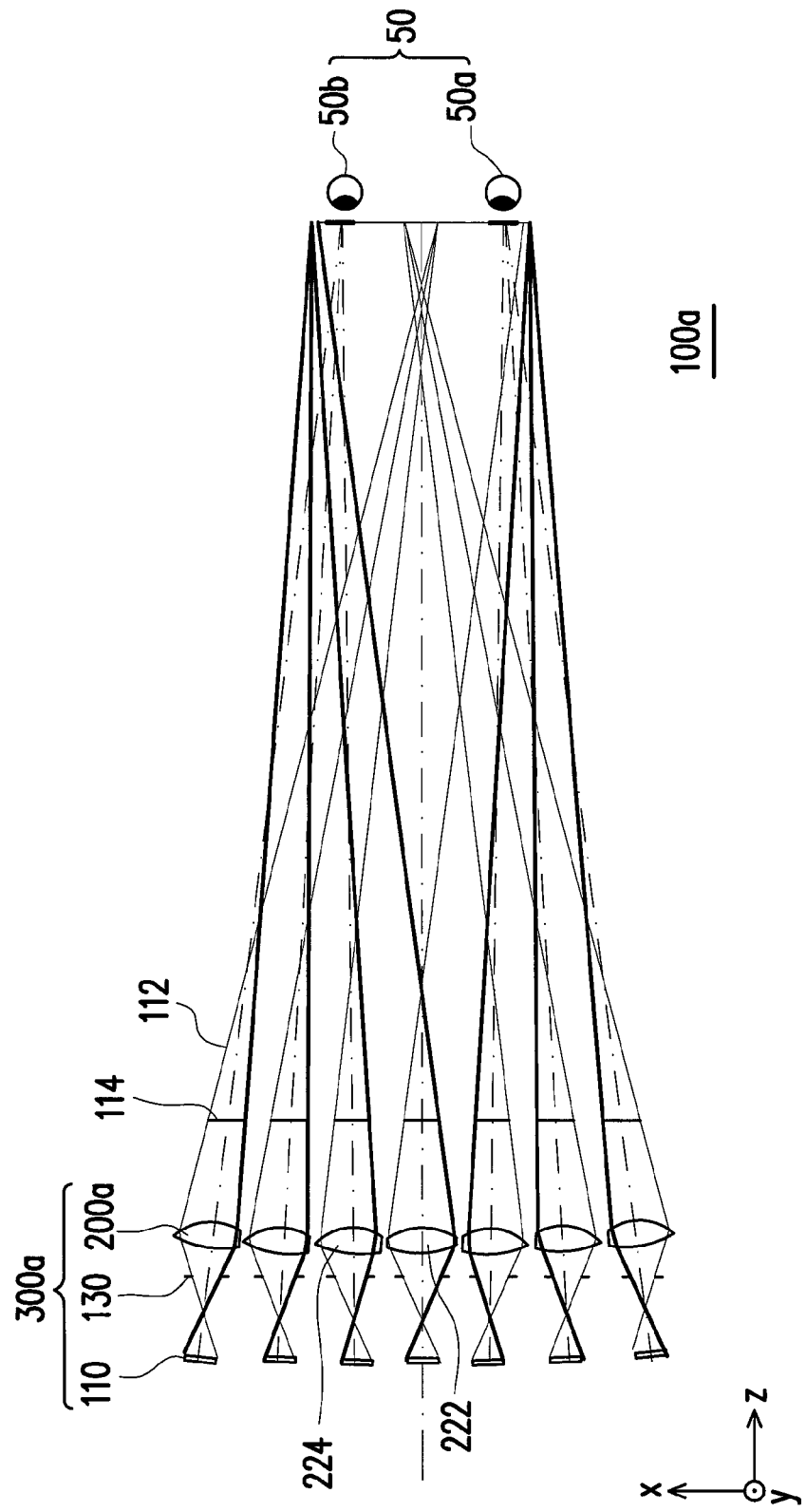
FIG. 5A and FIG. 5B are schematic side views illustrating a display apparatus respectively in two different directions according to another embodiment of the disclosure.
Figure 5B:
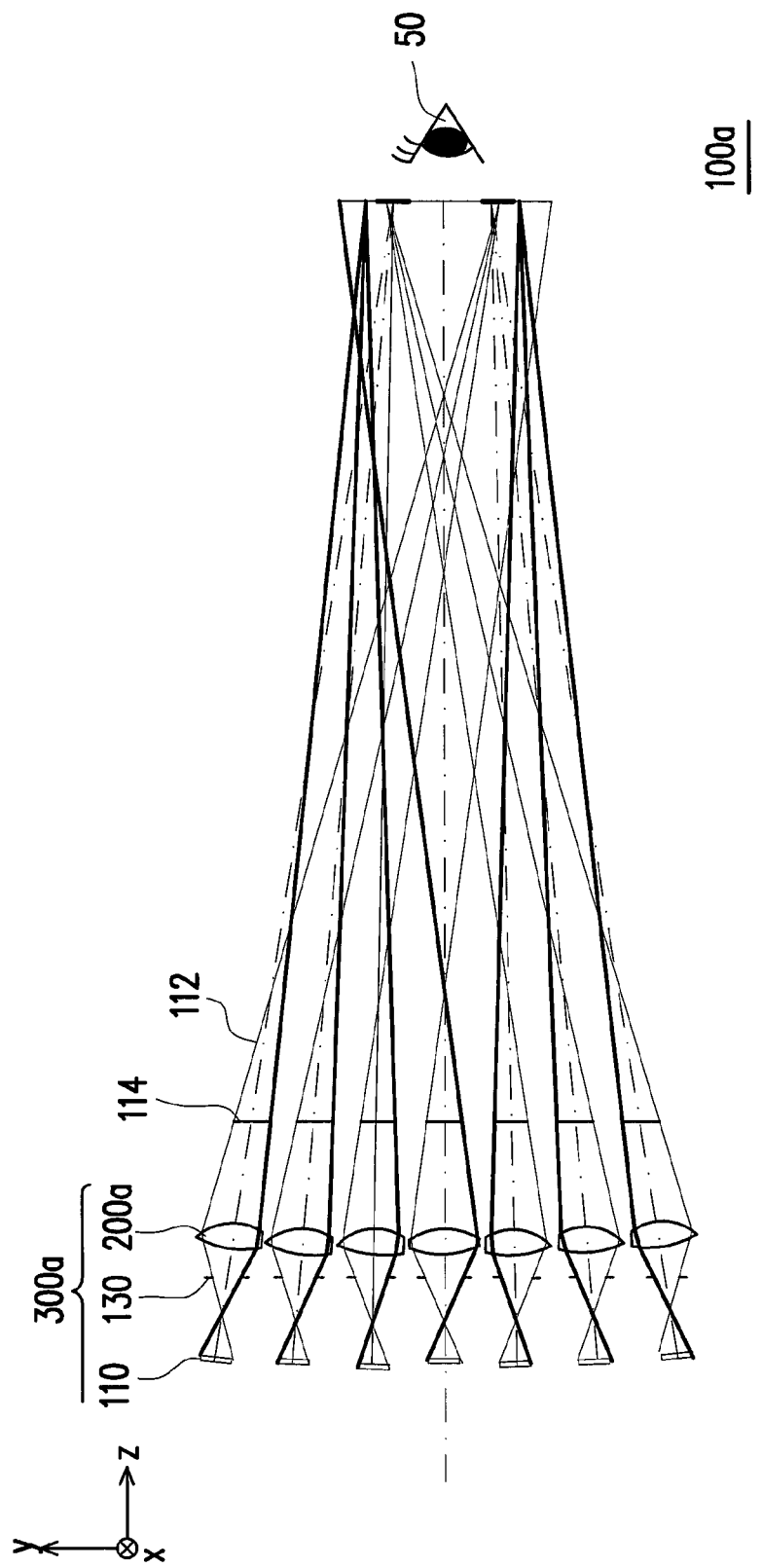
Figure 5C:
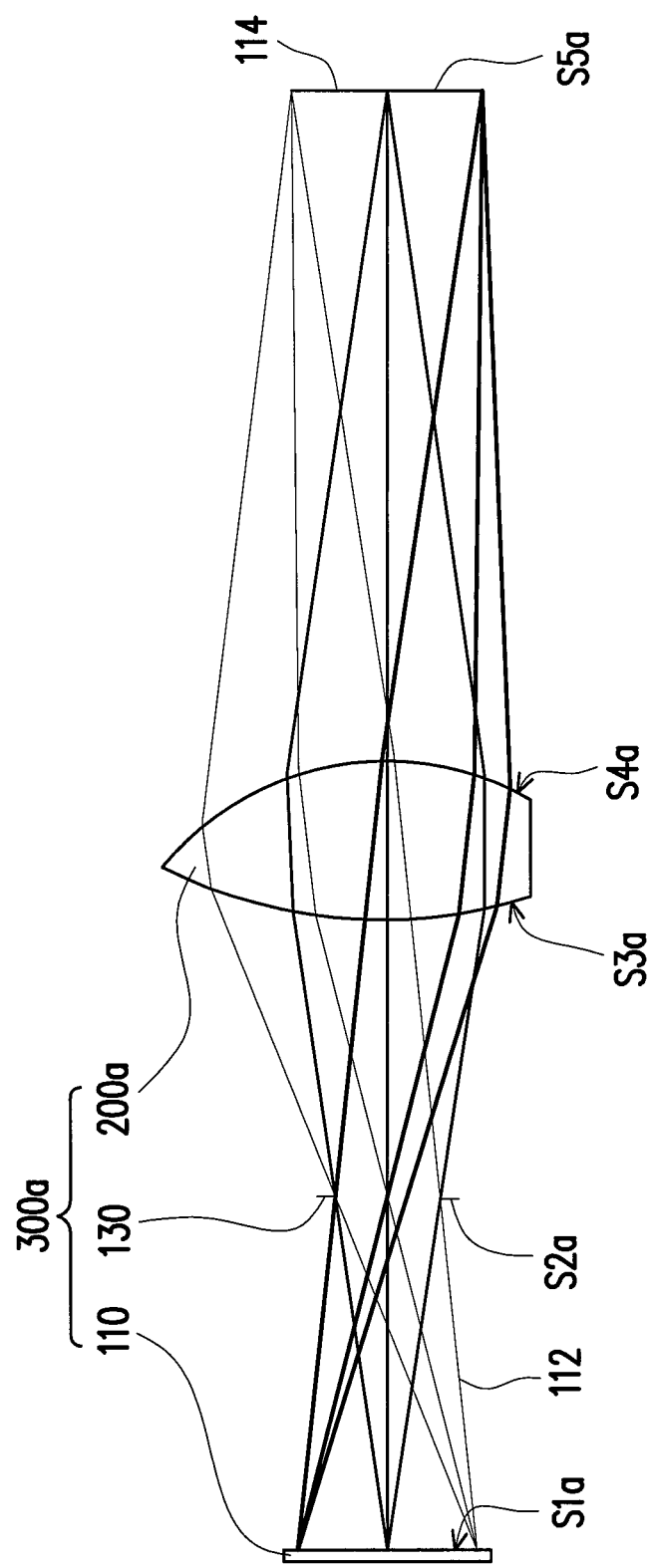
FIG. 5C is a schematic side view illustrating an image generating unit depicted in FIG. 5A.
Figure 6B:
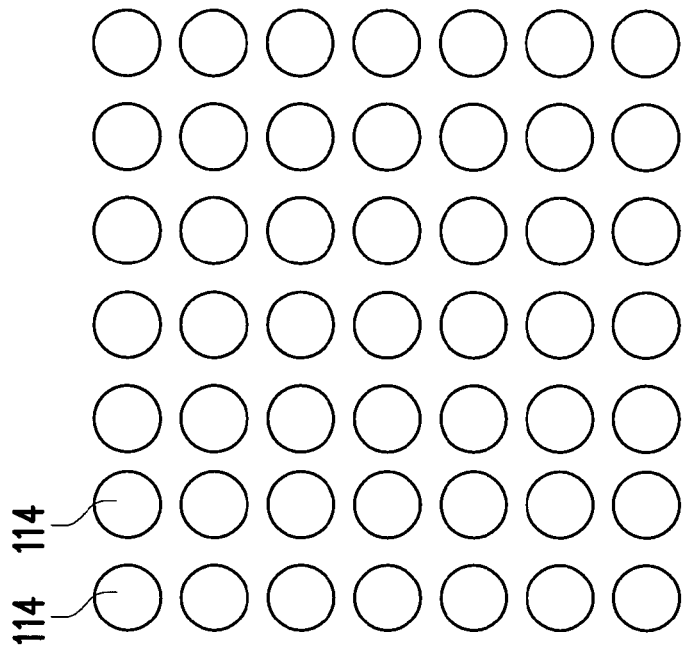
FIG. 6B is a front view illustrating the image depicted in FIG. 5A.
Figure 6A:
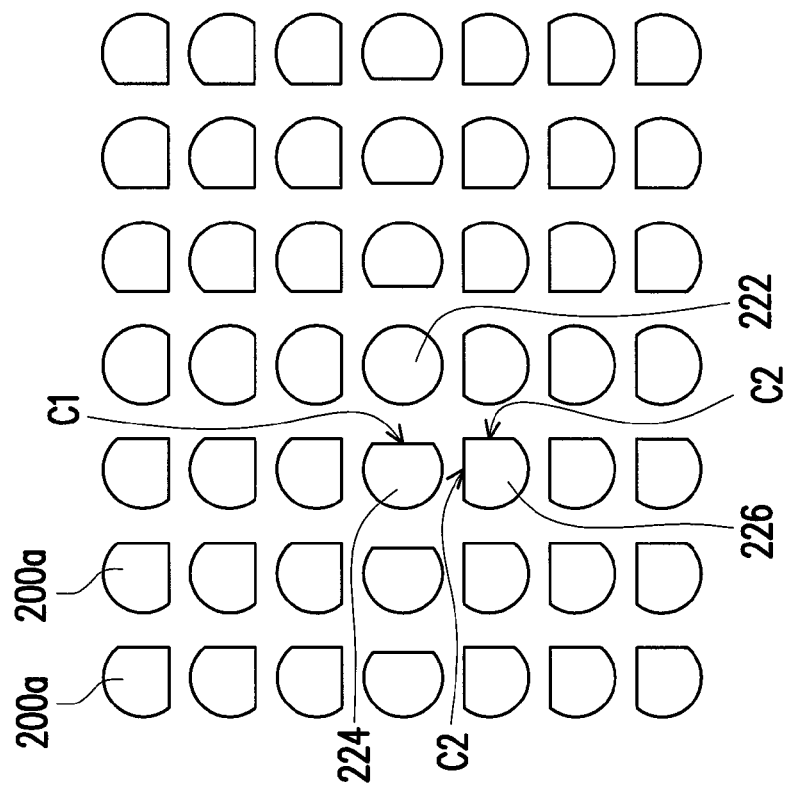
FIG. 6A is a front view illustrating the dioptric module depicted in FIG. 5A.

FIG. 5A and FIG. 5B are schematic side views illustrating a display apparatus respectively in two different directions according to another embodiment of the disclosure. FIG. 5C is a schematic side view illustrating an image generating unit depicted in FIG. 5A. FIG. 6A is a front view illustrating the dioptric module depicted in FIG. 5A. FIG. 6B is a front view illustrating the image depicted in FIG. 5A. With reference to FIG. 5A to FIG. 5C and FIG. 6A to FIG. 6B, the display apparatus 100a described in the present embodiment is similar to the display apparatus 100 depicted in FIG. 1A, and the difference between these two display apparatuses 100a and 100 is described as below. In the display apparatus 100a described in the present embodiment, the lenses of the dioptric modules 200a of the image generating units 300a are a combination of circular lenses 222, circular lenses 224 each with one side cut off, and circular lenses 226 each with two adjacent sides cut off According to the present embodiment, the cut-off side C1 of each circular lens 224 with one side cut off is located close to a center of the display apparatus 100a. Any one of the two adjacent cut-off sides C2 of each circular lens 226 with two adjacent sides cut off is located close to the circular lens 224 with one side cut off. In the present embodiment, the circular lenses 222 are located at the center of the display apparatus 100a. If all of the lenses are circular lenses, the image beam 112 does not pass through an entire lens for at least some of the circular lenses because the opening angle of the image beam 112 is subject to the aperture stop 130. Hence, the portions of the lenses where the image beam 112 does not pass may be trimmed. After the trimming process is performed, the distance among the centers of some of the dioptric modules 200a on the optical axes A may further decrease, and the volume of the display apparatus 100a is then reduced. Even though the distance among the centers of some of the dioptric modules 200a on the optical axes A decreases, the images 114 formed by the image generating units 300a may still be separated from one another.

An embodiment of the image generating unit 300a is provided in the following Table 3 and Table 4, which should not be construed as a limitation to the disclosure.

TABLE 3

| Surface | Radius (mm) | Interval (mm) | Material | Notes |
|---|---|---|---|---|
| S1a | Infinity | 27.624 | | Image source |
| S2a | Infinity | 20.662 | | Aperture stop |
| S3a | 32.985 | 12.000 | PMMAO | First lens |
| S4a | −19.518 | 50.000 | | |
| S5a | Infinity | | | Image |

Physical quantities in Table 3 are explained in the descriptions regarding Table 1 above.

Besides, in Table 3, the surface S1a is the active surface of the image source 110. The surface S2a is the aperture stop 130. The surfaces S3a and S4a are two opposite surfaces of the lens in the dioptric module 200. The surface S5a is the image 114. The numeral values of the parameters such as the radius of curvature and the distance of each surface are given in Table 3, and will not be repeated herein again. It can be learned from Table 3 that the lens of the dioptric module 200a described in the present embodiment has positive dioptric power, and the lens herein is a biconvex lens, for instance.

The surfaces S3a and S4a are aspheric surfaces and may be represented by the above equation expressing the surfaces S3 and S4. Besides, the descriptions of each parameter of the surfaces S3a and S4a may be referred to as those of the surfaces S3 and S4 and will not be provided hereinafter. The coefficient $A_1$ is zero according to the present embodiment. The aspheric parameter values of the surfaces S3a and S4a are listed in Table 4.

TABLE 4

| Aspheric parameter | Conic coefficient k | Coefficient $A_2$ | Coefficient $A_3$ | Coefficient $A_4$ | Coefficient $A_5$ |
|---|---|---|---|---|---|
| S3a | 1.441 | −1.145E−05 | −3.601E−08 | 0.000 | 0.000 |
| S4a | −0.3396 | 2.420E−05 | −1.313E−08 | 0.000 | 0.000 |

In the present embodiment, a magnification of the image generating unit 300a is 1, the object height is 7.5 mm, the image height (i.e., the height of images 114) is 7.5 mm, the focal length of the dioptric module 200a is 26.87 mm, a numerical aperture of the dioptric module 200a is 0.15, and the difference between the location of the aperture stop 130 and the location of the front focus of the dioptric module 200a is 0.75 mm, for instance, which should not be construed as limitations to the disclosure.

Figure 7A:
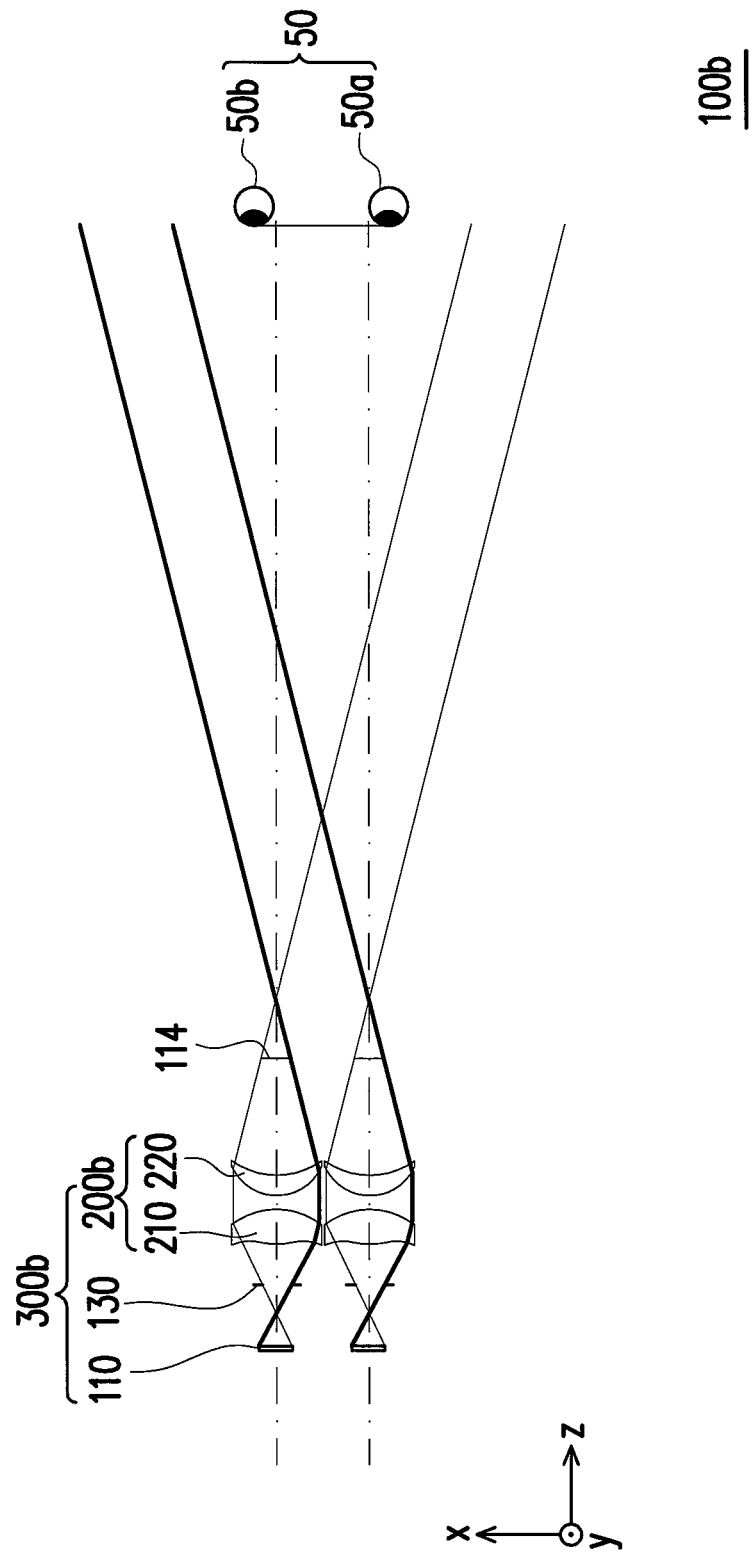
FIG. 7A and FIG. 7B are schematic side views illustrating a display apparatus respectively in two different directions according to still another embodiment of the disclosure.
Figure 7B:
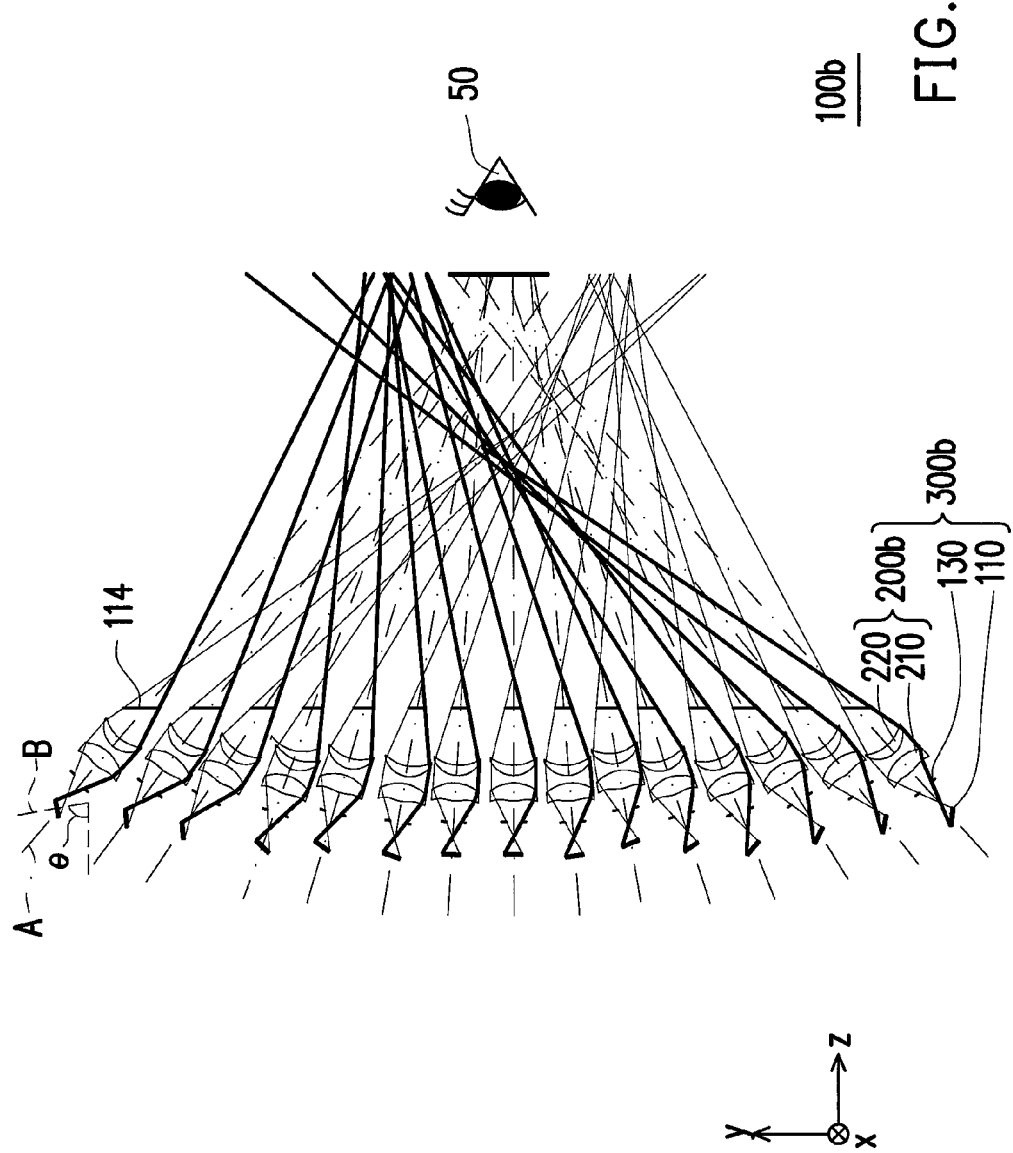
Figure 7C:
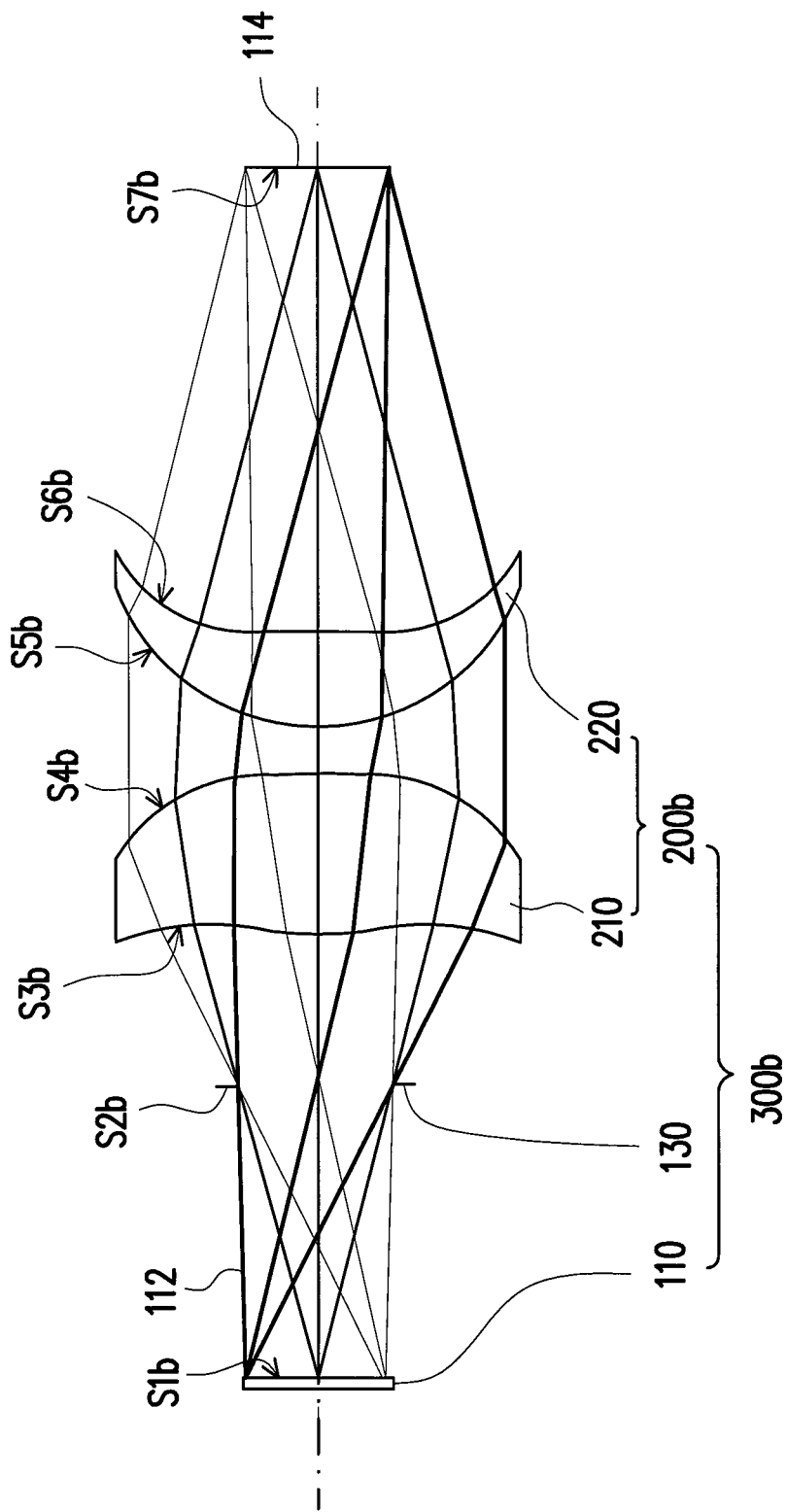
FIG. 7C is a schematic side view illustrating an image generating unit depicted in FIG. 7A.
Figure 8B:
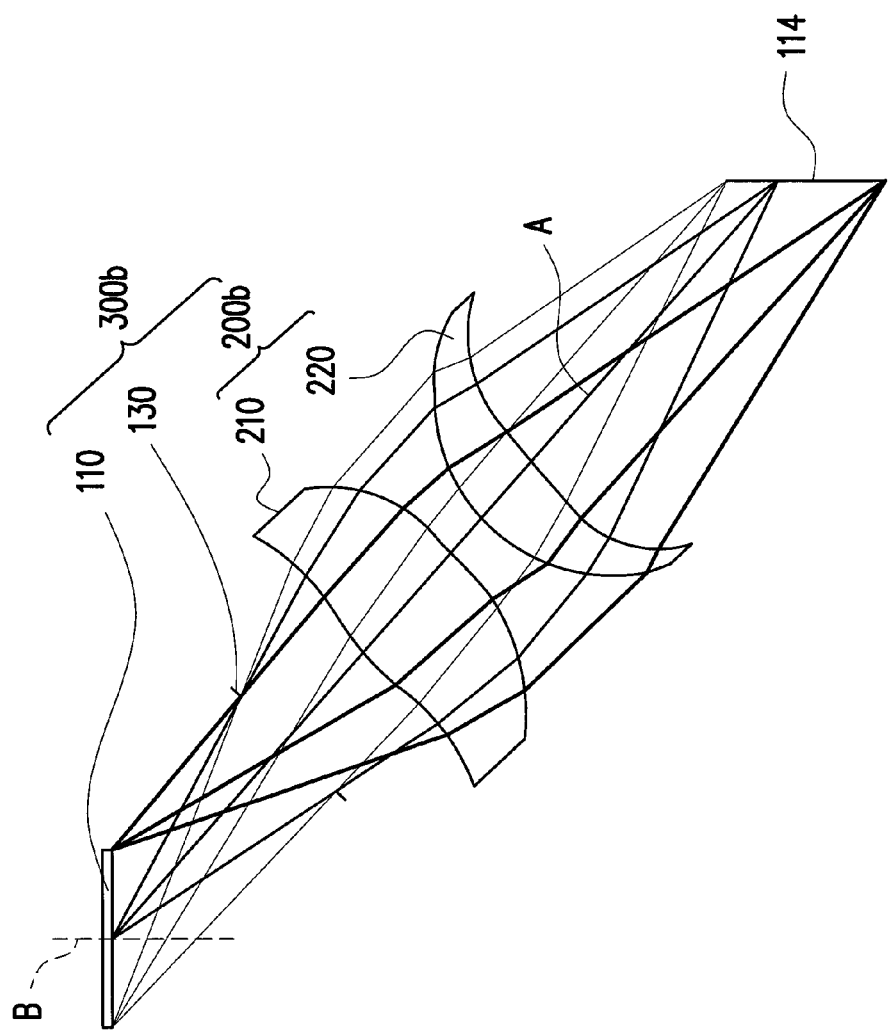
FIG. 8B illustrates that the optical axis of the image generating unit is rotated as shown in FIG. 7B, and the image source is also rotated.

FIG. 7A and FIG. 7B are schematic side views illustrating a display apparatus respectively in two different directions according to still another embodiment of the disclosure. FIG. 7C is a schematic side view illustrating an image generating unit depicted in FIG. 7A. FIG. 8A illustrates that the optical axis of the image generating unit is rotated but the image source is not rotated. FIG. 8B illustrates that the optical axis of the image generating unit is rotated as shown in FIG. 7B, and the image source is also rotated. FIG. 9A is a front view illustrating the dioptric modules depicted in FIG. 7A. FIG. 9B is a front view illustrating the image depicted in FIG. 7A. With reference to FIG. 7A to FIG. 7C, FIG. 8A to FIG. 8B, and FIG. 9A to FIG. 9B, the display apparatus 100b described in the present embodiment is similar to the display apparatus 100 depicted in FIG. 1A, and the difference between these two display apparatuses 100b and 100 is described as below. In the display apparatus 100b of the present embodiment, the dioptric module 200b of each image generating unit 300b comprises a plurality of lenses (e.g., the first lens 210 and the second lens 220 in this embodiment), and the first lens 210 is located between the aperture stop 130 and the second lens 220. As shown in FIG. 1C, the optical axes A are arranged more densely at a location close to the eye 50; therefore, the image generating units 300 are arranged in an arc-shaped manner, and the images 114 are also arranged on an arc-shaped surface. However, in the present embodiment, the images 114 formed by the image generating units 300b are substantially located on the same plane. Hence, the image generating units 300b initially arranged on the arc-shaped surface are moved, so that the image generating units 300b may be substantially arranged on the same plane. As shown in FIG. 7B, the image generating units 300b that are located at the upper and lower sides and arranged in the arc-shaped manner may be moved toward the −z-axis direction. Thereby, the image frame observed by the eye 50 of the user may be a planar image frame instead of a bent image frame (i.e., an arc-shaped image frame).

Besides, as shown in FIG. 8A, when the optical axis A of the image generating unit 300b is tilted, the image 114 generated by the image generating unit 300b is tilted as well. At this time, the image 114 observed by the user may encounter the problem of keystone distortion. To solve said problem, the image 114 generated by the image generating unit 300b may be tilted relative to the optical axis A of the image generating unit 300b, and a tilt direction of the image 114 relative to the optical axis A is opposite to a tilt direction of the image source 110 relative to the optical axis A according to the present embodiment shown in FIG. 8B. According to the present embodiment, the images 114 generated by each of at least part of the image generating units 300b (e.g., the image generating units 300b other than the image generating units 300b located at a row at the center of the display apparatus 100b in the y-axis direction) are tilted relative to the optical axes A of the image generating units 300b, and the tilt direction of the images 114 relative to the optical axes A is opposite to the tilt direction of the image sources 110 relative to the optical axes A.

The tilt degree of the image generating units 300b gradually increases from the center of the display apparatus 100b to an edge of the display apparatus 100b. Particularly, in the present embodiment, the image sources 110 of at least part of the image generating units 300b (e.g., the image generating units 300b other than the image generating units 300b located at a row at the center of the display apparatus 100b in the y-axis direction) are tilted relative to the optical axes A, and the tilt degree of the image sources 110 gradually increases from the center of the display apparatus 100b to the edge of the display apparatus 100b. Here, the optical axes A of the image generating units 300b may be defined as the optical axes of the dioptric modules 200b. Thereby, all of the images 114 may be on the same plane. For instance, in an embodiment of the disclosure, as shown in FIG. 7B and FIG. 8B, inclined angles θ between the optical axes B of the image sources 110 and the z axis are sequentially 41 degrees, 35 degrees, 29 degrees, 23 degrees, 18 degrees, 12 degrees, 6 degrees, 0 degree, −6 degrees, −12 degrees, −18 degrees, −23 degrees, −29 degrees, −35 degrees, and −41 degrees from top to bottom, which should not be construed as limitations to the disclosure. In addition, when the optical axes B extend from the −z-axis direction and the +y-axis direction to the +z-axis direction and the −y-axis direction, the corresponding inclined angles θ are defined to have positive values; when the optical axes B extend from the −z-axis direction and the −y-axis direction to the +z-axis direction and the +y-axis direction, the corresponding inclined angles θ are defined to have negative values. It can be observed from FIG. 9A that the dioptric modules 200b are gradually tilted along a direction away from the center of the display apparatus 100b, and thereby the area occupied by the dioptric modules 200b, as shown in FIG. 9A (the front view of the dioptric modules 200b), gradually decreases from the center to the edge of the display apparatus 100b. With reference to FIG. 9B, the dimensions of the images 114 are substantially identical, and the issue of keystone distortion does not occur.

An embodiment of the image generating unit 300b is provided in the following Table 5 and Table 6, which should not be construed as a limitation to the disclosure.

TABLE 5

| Surface | Radius (mm) | Interval (mm) | Material | Notes |
|---------|-------------|---------------|----------|-------|
| S1b | Infinity | 32.598 | | Image source |
| S2b | Infinity | 16.313 | | Aperture stop |
| S3b | 70.513 | 17.000 | PMMAO | First lens |
| S4b | −84.846 | 5.000 | | |
| S5b | 22.762 | 10.390 | PMMAO | Second lens |
| S6b | −359.171 | 50.000 | | |
| S7b | Infinity | | | Image |

Physical quantities in Table 5 are described in Table 1 above.

Besides, in Table 5, the surface S1b is the active surface of the image source 110. The surface S2b is the aperture stop 130. Moreover, the surfaces S3b and S4b are two opposite surfaces of the first lens 210, and the surfaces S5b and S6b are two opposite surfaces of the second lens 220. The surface S7b is the image 114. The numeral values of the parameters such as the radius of curvature and the distance of each surface are given in Table 5, and will not be repeated herein again. It can be learned from Table 5 that the first lens 210 and the second lens 220 described in the present embodiment have positive dioptric power, and each of the first lens 210 and the second lens 220 is an aspheric biconvex lens, for instance.

The surfaces S3b, S4b, S5b, and S6b are aspheric surfaces and may be represented by the above equation expressing the surfaces S3 and S4. Besides, the descriptions of each parameter of the surfaces S3b, S4b, S5b, and S6b may be referred to as those of the surfaces S3 and S4 and will not be provided hereinafter. The coefficient $A_1$ is zero according to the present embodiment. The aspheric parameter values of the surfaces S3b, S4b, S5b, and S6b are listed in Table 6.

TABLE 6

| Aspheric parameter | Conic coefficient k | Coefficient $A_2$ | Coefficient $A_3$ | Coefficient $A_4$ | Coefficient $A_5$ |
|---|---|---|---|---|---|
| S3b | 0.000 | −1.613E−05 | −1.230E−08 | 0.000 | 0.000 |
| S4b | 0.000 | −2.711E−05 | −8.552E−09 | 0.000 | 0.000 |
| S5b | 0.000 | 2.949E−06 | 0.000 | 0.000 | 0.000 |
| S6b | 0.000 | 4.630E−05 | 0.000 | 0.000 | 0.000 |

In the present embodiment, a magnification of the image generating unit 300b is 1, the object height is 7.5 mm, the image height (i.e., the height of images 114) is 7.5 mm, the focal length of the dioptric module 200b is 31.39 mm, a numerical aperture of the dioptric module 200b is 0.25, and the difference between the location of the aperture stop 130 and the location of the front focus of the dioptric module 200b is 1.21 mm, for instance, which should not be construed as limitations to the disclosure.

FIG. 10 is a schematic three-dimensional view illustrating a display apparatus according to still another embodiment of the disclosure. The display apparatus 100c described in the present embodiment is similar to the display apparatus 100 depicted in FIG. 1A, and the difference between these two display apparatuses 100c and 100 is described as below. In the present embodiment, the object distance adjusting unit 140c comprises a plurality of adjusting sub-units 141c, each of which respectively connects one of the image sources 110 and the corresponding dioptric module 200, so as to individually adjust the distance between the image source 110 and the dioptric module 200 in each of the image generating units 300. Namely, one adjusting sub-unit 141c in this embodiment is similar to one object distance adjusting unit 140 depicted in FIG. 1A, while the difference therebetween lies in that the adjusting sub-unit 141c connects the image source 110 and the corresponding dioptric module 200 in one image generating unit 300, and that the object distance adjusting unit 140 depicted in FIG. 1A simultaneously connect the image sources 110 and the dioptric modules 200 in the image generating units 300. Thereby, in the present embodiment, the distance (i.e., the object distance) between the image source 110 and the dioptric module 200 in each of the image generating units 300 may be adjusted in different manner. When the object distance in different image generating units 300 is adjusted to have different values, the corresponding image distance is also different, such that the images 114 are not located on the same plane. Thereby, the user who observes the images 114 may feel the difference in distance from the images 114 to him or her and can therefore have the visual experience of stereoscopic sensation. Namely, the images 114 herein may be combined to form the 3D image frame.

To sum up, in the display apparatus described in an embodiment of the disclosure, the dioptric modules respectively form the images of the image sources floating in the air, and the floating images may be combined in the air to form an image frame. Thereby, the floating image frame may be generated by the display apparatus. As such, when the display apparatus is applied together with an optical detection apparatus, the optical detection apparatus may detect the location of a user's finger and determine whether the user's finger touches the floating image frame, so as to form a non-contact floating air-touch interface. Moreover, since plural dioptric modules are employed, the dimension of each dioptric module may be reduced, and thus the lenses in the dioptric modules may have the reduced size. Thereby, the image frame may be formed in no need of manufacturing a lens with large size, and the display apparatus in this embodiment may overcome the difficulty in manufacturing the large-size lens as well as reduce the manufacturing costs.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display apparatus comprising:
    a plurality of image generating units, each of the image generating units comprising:
        an image source providing an image beam; and
        a dioptric module disposed on a light path of the image beam and having dioptric power, wherein the dioptric module forms an image floating in the air and corresponding to the image source, and the dioptric module is located between the image source and the image,
    wherein the dioptric modules of the image generating units are respectively disposed on the light paths of the image beams respectively provided by the image generating units,
    wherein the image generating units are arranged in an array, and the images formed by the image generating units are arranged in an array and combined to form an image frame,
    wherein an optical axis of each of the image generating units has a first end located at the image source and a second end closer to an eye of a user than the first end, the image is located between the dioptric module and the eye of the user, and the second ends of the optical axes of the image generating units are arranged more densely than the first ends of the optical axes.

2. The display apparatus as recited in claim 1, wherein each of the image generating units satisfies $NA \geq \sin(\tan^{-1}(Y/L))$, NA is a numerical aperture of the each of the image generating units, Y is half a height of the image formed by the each of the image generating units, L is a distance from the image to one eye of a user along a direction parallel to an optical axis of the dioptric module, the distance L is the shortest distance allowing the one eye of the user to observe the entire image, and the image is located between the dioptric module and the one eye of the user.

3. The display apparatus as recited in claim 2, wherein 25 cm ≤ L ≤ 2 m.

4. The display apparatus as recited in claim 1, wherein each of the image generating units satisfies $NA \geq \sin(\tan^{-1}((2Y+E)/2D))$, NA is a numerical aperture of the each of the image generating units, Y is half a height of the image formed by the each of the image generating units, E is an interval between two eyes of a user, D is a distance from the image to the eyes of the user along a direction parallel to an optical axis of the dioptric module, the distance D is the shortest distance allowing the eyes of the user to observe the entire image, and the image is located between the dioptric module and the eyes of the user.

5. The display apparatus as recited in claim 4, wherein 25 cm ≤ D ≤ 2 m.

6. The display apparatus as recited in claim 1, wherein the images formed by the image generating units are real images.

7. The display apparatus as recited in claim 1, wherein the image generating units are arranged in a two-dimensional array, and the images are arranged in a two-dimensional array.

8. The display apparatus as recited in claim 1, wherein the images formed by the image generating units are substantially located on a same plane.

9. The display apparatus as recited in claim 1, wherein the image formed by each of at least part of the image generating units is tilted relative to the optical axis of the each of at least part of the image generating units, and a tilt direction of the image relative to the optical axis is opposite to a tilt direction of the image source relative to the optical axis.

10. The display apparatus as recited in claim 9, wherein the image sources of at least parts of the image generating units are tilted relative to the optical axes, and a tilt degree of the image sources relative to the optical axes gradually increases from a center of the display apparatus to an edge of the display apparatus.

11. The display apparatus as recited in claim 1, wherein numerical apertures of the image generating units are substantially identical, and dimensions of the images formed by the image generating units are substantially identical.

12. The display apparatus as recited in claim 1, wherein numerical apertures of the image generating units are different, but dimensions of the images formed by the image generating units are substantially identical.

13. The display apparatus as recited in claim 1, wherein numerical apertures of the image generating units are different, and dimensions of the images formed by the image generating units are different.

14. The display apparatus as recited in claim 1, wherein the image source of each of the image generating units is a display panel, a light-emitting device, or an object irradiated by light.

15. The display apparatus as recited in claim 1, wherein space exists among the images respectively formed by the image generating units.

16. The display apparatus as recited in claim 1, wherein a distance from the image frame formed by the image generating units to eyes of a user is less than or substantially equal to a length ranging from 25 cm to 2 m so that the image is at a location where the user's finger or an object held by the user is capable of touching the image.

17. The display apparatus as recited in claim 16, wherein all of the images are observed by each of the eyes of the user when the distance from the image frame formed by the image generating units to the eyes of the user is less than or substantially equal to the length ranging from 25 cm to 2 m.

18. The display apparatus as recited in claim 16, wherein parts of the images are observed by a left eye of the user and the other parts of the images are observed by a right eye of the user when the distance from the image frame formed by the image generating units to the eyes of the user is less than or substantially equal to the length ranging from 25 cm to 2 m.

19. The display apparatus as recited in claim 16, wherein when the distance from the image frame formed by the image generating units to the eyes of the user is less than or substantially equal to the length ranging from 25 cm to 2 m, parts of the images are observed by the eyes of the user, and different parts of the images are observed by the eyes of the user when the eyes of the user are moved to a different location.

20. The display apparatus as recited in claim 1, wherein the dioptric module of each of the image generating units comprises at least one lens.

21. The display apparatus as recited in claim 20, wherein the at least one lens of the each of the image generating units is a circular lens, a circular lens with one side cut off, a circular lens with two adjacent sides cut off, or a combination thereof.

22. The display apparatus as recited in claim 21, wherein the cut-off one side of the circular lens with one side cut off faces a center of the display apparatus.

23. The display apparatus as recited in claim 22, wherein any one of the two cut-off adjacent sides of the circular lens with two adjacent sides cut off faces the circular lens with one side cut off.

24. The display apparatus as recited in claim 1, wherein the image source is a liquid crystal display panel, an organic light-emitting diode display panel, a plasma display panel, a light-emitting device, or an object irradiated by light.

25. The display apparatus as recited in claim 1, further comprising an object distance adjusting unit connecting the image sources and the dioptric modules, so as to adjust a distance between the image sources and the dioptric modules.

26. A display apparatus comprising:
   a plurality of image generating units, each of the image generating units comprising:
      an image source providing an image beam;
      a dioptric module disposed on a light path of the image beam and having dioptric power, wherein the dioptric module forms an image floating in the air and corresponding to the image source, and the dioptric module is located between the image source and the image; and
      an object distance adjusting unit connecting the image sources and the dioptric modules, so as to adjust a distance between the image sources and the dioptric modules,
   wherein the dioptric modules of the image generating units are respectively disposed on the light paths of the image beams respectively provided by the image generating units,
   wherein the image generating units are arranged in an array, and the images formed by the image generating units are arranged in an array and combined to form an image frame,
   wherein the object distance adjusting unit comprises a plurality of adjusting sub-units, each of the adjusting sub-units respectively connects one of the image sources and one of the dioptric modules corresponding to the one of the image sources, so as to individually adjust the distance between the image source and the dioptric module in each of the image generating units.

27. The display apparatus as recited in claim 26, wherein an interval among the images is less than or substantially equal to an interval among the dioptric modules.

28. The display apparatus as recited in claim 26, wherein an interval among the images is greater than an interval among the dioptric modules.

* * * * *